US012750796B2

(12) United States Patent
Shim

(10) Patent No.: US 12,750,796 B2
(45) Date of Patent: Sep. 29, 2026

(54) ELECTRONIC DEVICE AND METHOD FOR PHASE ALIGNMENT

(71) Applicant: Samsung Electronics Co., Ltd., Suwon-si (KR)

(72) Inventor: Seijoon Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 18/406,762

(22) Filed: Jan. 8, 2024

(65) Prior Publication Data

US 2024/0205850 A1 Jun. 20, 2024

Related U.S. Application Data

(63) Continuation of application No. PCT/KR2023/020841, filed on Dec. 15, 2023.

(30) Foreign Application Priority Data

Dec. 20, 2022 (KR) ........................ 10-2022-0179643
Jan. 27, 2023 (KR) ........................ 10-2023-0011278
Mar. 7, 2023 (KR) ........................ 10-2023-0030023

(51) Int. Cl.
*H04W 56/00* (2009.01)
*H04L 5/00* (2006.01)

(52) U.S. Cl.
CPC ......... *H04W 56/001* (2013.01); *H04L 5/0048* (2013.01)

(58) Field of Classification Search
CPC ............................ H04L 56/001; H04L 5/0048
(Continued)

(56) References Cited

U.S. PATENT DOCUMENTS 7,817,747 B2 10/2010 Waheed et al.
8,045,926 B2 10/2011 Martikkala et al.
(Continued)

FOREIGN PATENT DOCUMENTS

CN 101588198 A 11/2009
KR 10-1545752 B1 8/2015
(Continued)

OTHER PUBLICATIONS

Extended European Search Report dated Jan. 15, 2026 issued in European Patent Application No. 23907643.3.
(Continued)

*Primary Examiner* — Sibte H Bukhari
(74) *Attorney, Agent, or Firm* — Nixon & Vanderhye, P.C.

(57) ABSTRACT

In various example embodiments, a method performed by a digital unit (DU) is provided. The method may comprise providing a radio unit (RU) with one or more reference signals for phase alignment. The one or more reference signals may be associated with one or more transmission paths of the RU. The method may comprise transmitting, to the radio unit (RU), a response signal control message for a response message. The method may comprise receiving, from the RU, the response message. The response message may include, for each transmission path of the one or more transmission paths of the RU, a path identifier (ID) and a response signal for a reference signal corresponding to the path ID.

22 Claims, 16 Drawing Sheets

(58) Field of Classification Search
USPC .......................................................... 370/350
See application file for complete search history.

(56) References Cited

U.S. PATENT DOCUMENTS

| | | | |
|---|---|---|---|
| 9,344,268 B1 | 5/2016 | Nazemi et al. | |
| 10,440,734 B2 | 10/2019 | Sun et al. | |
| 10,917,140 B2 | 2/2021 | Tan et al. | |
| 11,444,670 B1 | 9/2022 | Kleider et al. | |
| 11,528,106 B2 | 12/2022 | Park et al. | |
| 11,778,632 B2 | 10/2023 | Jeon et al. | |
| 12,375,206 B2 | 7/2025 | Vagner et al. | |
| 2003/0032390 A1 | 2/2003 | Geile et al. | |
| 2007/0129857 A1 | 6/2007 | Fortier | |
| 2016/0037550 A1 | 2/2016 | Barabell et al. | |
| 2021/0367728 A1 | 11/2021 | Park et al. | |
| 2022/0239328 A1 | 7/2022 | Rafique et al. | |
| 2022/0303209 A1* | 9/2022 | Zou | H04W 40/04 |
| 2023/0216552 A1 | 7/2023 | Jeon et al. | |
| 2023/0231686 A1 | 7/2023 | Jeon et al. | |
| 2023/0262474 A1 | 8/2023 | Shim et al. | |
| 2024/0205850 A1* | 6/2024 | Shim | H04L 5/0048 |

FOREIGN PATENT DOCUMENTS

| | | |
|---|---|---|
| KR | 10-2020-0037375 | 4/2020 |
| KR | 10-2021-0046486 | 4/2021 |
| KR | 10-2022-0037308 | 3/2022 |
| WO | 2015149300 A1 | 10/2015 |
| WO | 2022173230 A1 | 8/2022 |
| WO | 2022/246410 | 11/2022 |
| WO | 2022/060186 | 7/2023 |

OTHER PUBLICATIONS

Search Report and Written Opinion dated Mar. 19, 2024 issued in International Patent Application No. PCT/KR2023/020841.

Paulraj et al., Introduction to space-time wireless communications, Cambridge University Press, 2003, 33 pages.

* cited by examiner

ELECTRONIC DEVICE AND METHOD FOR PHASE ALIGNMENT

CROSS-REFERENCE TO RELATED APPLICATIONS

This application is a continuation of International Application No. PCT/KR2023/020841 designating the United States, filed on Dec. 15, 2023, in the Korean Intellectual Property Receiving Office and claiming priority to Korean Patent Application Nos. 10-2022-0179643, filed on Dec. 20, 2022, 10-2023-0011278, filed on Jan. 27, 2023, and 10-2023-0030023, filed on Mar. 7, 2023, in the Korean Intellectual Property Office, the disclosures of each of which are incorporated by reference herein in their entireties.

BACKGROUND

Field

The disclosure relates to an electronic device and a method for phase alignment.

Description of Related Art

Along with increasing of transmission capacity in wireless communication systems, a function split that functionally separates a base station is being applied. According to such a function split, the base station may be split into a distributed unit (DU) and a radio unit (RU). A fronthaul interface is defined for communications between the DU and the RU.

The above information may be provided as a related art for the purpose of helping understanding of the present disclosure. Neither claim nor determination is made herein as to whether any of the contents of the above information may be applied as a prior art related to the disclosure.

SUMMARY

According to various example embodiments, a method performed by a digital unit (DU) is provided. The method may comprise providing a radio unit (RU) with one or more reference signals for phase alignment. The one or more reference signals may be associated with one or more transmission paths of the RU. The method may comprise transmitting, to the RU, a response signal control message for a response message. The method may comprise receiving, from the RU, the response message. The response message may include, for each transmission path of the one or more transmission paths of the RU, a path identifier (ID) and a response signal for a reference signal corresponding to the path ID.

According to various example embodiments, a method performed by a radio unit (RU) is provided. The method may comprise obtaining one or more reference signals for phase alignment from a digital unit (DU). The one or more reference signals may be associated with one or more transmission paths of the RU. The method may comprise receiving, from the DU, a response signal control message for a response message. The method may comprise transmitting, to the DU, the response message. The response message may include, for each transmission path of the one or more transmission paths of the RU, a path identifier (ID) and a response signal for a reference signal corresponding to the path ID.

According to various example embodiments, an electronic device of a digital unit (DU) is provided. The electronic device may comprise: a memory, at least one transceiver, and at least one processor coupled to the memory and the at least one transceiver. The at least one processor is configured to provide a radio unit (RU) with one or more reference signals for phase alignment. The one or more reference signals may be associated with one or more transmission paths of the RU. The at least one processor is configured to control the transceiver to transmit, to the RU, a response signal control message for a response message. The at least one processor is configured to control the transceiver to receive, from the RU, the response message. The response message may include, for each transmission path of the one or more transmission paths of the RU, a path identifier (ID) and a response signal for a reference signal corresponding to the path ID.

According to various example embodiments, an electronic device of a radio unit (RU) is provided. The electronic device may comprise: a memory, at least one transceiver, and at least one processor coupled to the memory and the at least one transceiver. The at least one processor may be configured to obtain one or more reference signals for phase alignment from a digital unit (DU). The one or more reference signals may be associated with one or more transmission paths of the RU. The at least one processor may be configured to control the transceiver to receive, from the DU, a response signal control message for a response message. The at least one processor may be configured to control the transceiver to transmit, to the DU, the response message. The response message may include, for each transmission path of the one or more transmission paths of the RU, a path identifier (ID) and a response signal for a reference signal corresponding to the path ID.

According to various example embodiments, a non-transitory computer-readable storage medium is provided. The non-transitory computer-readable storage may comprise a memory storing instructions. The instructions, when executed by a processor, causes a digital unit (DU) to: provide a radio unit (RU) with one or more reference signals for phase alignment, transmit, to the RU, a response signal control message for a response message, and receive, from the RU, the response message. The one or more reference signals may be associated with one or more transmission paths of the RU. The response message may include, for each transmission path of the one or more transmission paths of the RU, a path identifier (ID) and a response signal for a reference signal corresponding to the path ID.

According to various example embodiments, a non-transitory computer-readable storage medium is provided. The non-transitory computer-readable storage may comprise a memory storing instructions. The instructions, when executed by a processor, causes a radio unit (RU) to: obtain one or more reference signals for phase alignment from a digital unit (DU), receive, from the DU, a response signal control message for a response message, and transmit, to the DU, the response message. The one or more reference signals may be associated with one or more transmission paths of the RU. The response message may include, for each transmission path of the one or more transmission paths of the RU, a path identifier (ID) and a response signal for a reference signal corresponding to the path ID.

According to various example embodiments, a method performed by a digital unit (DU) is provided. The method comprises transmitting, through a fronthaul interface, to a radio unit (RU), a reference signal control message for one or more reference signals. The reference signal control message includes an identifier (ID) of the RU and one or more path IDs of one or more transmission paths of the RU. The method comprises transmitting, through the fronthaul interface, to the RU, a data message including data of the one or more reference signals based on the reference signal control message, the data message causing the RU to transmit the one or more reference signals respectively through the one or more transmission paths of the RU. The method comprises transmitting, through the fronthaul interface, to the RU, a response signal control message for a response message. The method comprises receiving, through the fronthaul interface, from the RU, the response message. The response message includes data of one or more response signals for the one or more reference signals and the one or more path IDs of the one or more transmission paths of the RU. The one or more response signals are usable for phase alignment for joint transmission.

According to various example embodiments, a method performed by a radio unit (RU) is provided. The method comprises receiving, through a fronthaul interface, from a distribute unit (DU), a reference signal control message for one or more reference signals. The reference signal control message includes an identifier (ID) of the RU and one or more path IDs of one or more transmission paths of the RU. The method comprises receiving, through the fronthaul interface, from the DU, a data message including data of the one or more reference signals based on the reference signal control message. The method comprises obtaining one or more response signals by transmitting the one or more reference signals through the one or more transmission paths of the RU, respectively. The method comprises receiving, through the fronthaul interface, from the DU, a response signal control message for a response message. The method comprises transmitting, through the fronthaul interface, to the DU, the response message. The response message includes data of one or more response signals for the one or more reference signals and the one or more path IDs of the one or more transmission paths of the RU. The one or more response signals are usable for phase alignment for joint transmission.

According to various example embodiments, a digital unit (DU) is provided. The DU comprises a transceiver, a processor, and memory storing instructions that, when executed by the at least one processor, cause the DU to control the transceiver to transmit, through a fronthaul interface, to a radio unit (RU), a reference signal control message for one or more reference signals. The reference signal control message includes an identifier (ID) of the RU and one or more path IDs of one or more transmission paths of the RU. The instructions, when executed by the at least one processor, cause the DU to control the transceiver to transmit, through the fronthaul interface, to the RU, a data message including data of the one or more reference signals based on the reference signal control message, the data message causing the RU to transmit the one or more reference signals respectively through the one or more transmission paths of the RU, control the transceiver to transmit, through the fronthaul interface, to the RU, a response signal control message for a response message, and control the transceiver to receive, through the fronthaul interface, from the RU, the response message. The response message includes data of one or more response signals for the one or more reference signals and the one or more path IDs of the one or more transmission paths of the RU. The one or more response signals are usable for phase alignment for joint transmission.

According to various example embodiments, a radio unit (RU), comprises a transceiver, a processor, and memory storing instructions that, when executed by the processor, cause the RU to control the transceiver to receive, through a fronthaul interface, from a distribute unit (DU), a reference signal control message for one or more reference signals. The reference signal control message includes an identifier (ID) of the RU and one or more path IDs of one or more transmission paths of the RU. The instructions, when executed by the at least one processor, cause the DU to control the transceiver to receive, through the fronthaul interface, from the DU, a data message including the one or more reference signals based on the reference signal control message, obtain one or more response signals by transmitting the one or more reference signals through the one or more transmission paths of the RU, respectively, control the transceiver to receive, through the fronthaul interface, from the DU, a response signal control message for a response message, and control the transceiver to transmit, through the fronthaul interface, to the DU, the response message. The response message includes data of one or more response signals for the one or more reference signals and the one or more path IDs of the one or more transmission paths of the RU. The one or more response signals are usable for phase alignment for joint transmission.

According to various example embodiments, a non-transitory computer-readable storage medium is provided. The non-transitory computer-readable storage medium stores instructions, that, when executed by a processor of a digital unit (DU), cause the DU to perform operations comprising transmitting, through a fronthaul interface, to a radio unit (RU), a reference signal control message for one or more reference signals. The reference signal control message includes an identifier (ID) of the RU and one or more path IDs of one or more transmission paths of the RU. The operations comprise transmitting, through the fronthaul interface, to the RU, a data message including data of the one or more reference signals based on the reference signal control message, the data message causing the RU to transmit the one or more reference signals respectively through the one or more transmission paths of the RU, transmitting, through the fronthaul interface, to the RU, a response signal control message for a response message, and receiving, through the fronthaul interface, from the RU, the response message. The response message includes data of one or more response signals for the one or more reference signals and the one or more path IDs of the one or more transmission paths of the RU. The one or more response signals are usable for phase alignment for joint transmission.

According to various example embodiments, a non-transitory computer-readable storage medium is provided. The non-transitory computer-readable storage medium stores instructions, that, when executed by a processor of a digital unit (DU), cause the DU to perform operations comprising receiving, through a fronthaul interface, from a distribute unit (DU), a reference signal control message for one or more reference signals. The reference signal control message includes an identifier (ID) of the RU and one or more path IDs of one or more transmission paths of the RU. The operations comprise receiving, through the fronthaul interface, from the DU, a data message including data of the one or more reference signals based on the reference signal control message, obtaining one or more response signals by transmitting the one or more reference signals through the one or more transmission paths of the RU, respectively, receiving, through the fronthaul interface, from the DU, a response signal control message for a response message, and transmitting, through the fronthaul interface, to the DU, the response message. The response message includes data of one or more response signals for the one or more reference signals and the one or more path IDs of the one or more transmission paths of the RU. The one or more response signals are usable for phase alignment for joint transmission.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
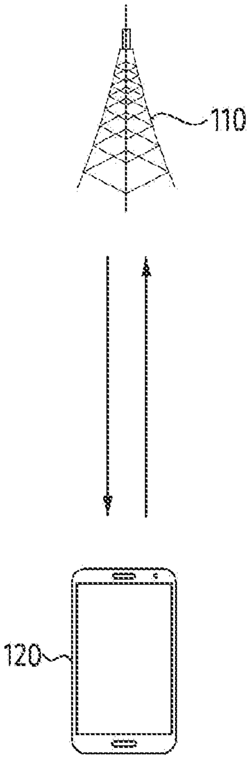
FIG. 1 is a diagram illustrating an example wireless communication system.

The terms used in the disclosure are used to describe various example embodiments and are not intended to limit the scope of other embodiments. A singular expression may include a plural expression, unless the context clearly dictates otherwise. The terms used herein, including technical and scientific terms, may have the same meanings as those commonly understood by those skilled in the art to which the disclosure pertains. Terms defined in a general dictionary amongst the terms used in the disclosure may be interpreted as having the same or similar meaning as those in context of the related art, and they are not to be construed in an ideal or overly formal sense, unless explicitly defined in the disclosure. In some cases, even the terms defined in the disclosure may not be interpreted to exclude embodiments of the disclosure.

In various examples of the disclosure described below, a hardware approach will be described as an example. However, since various embodiments of the disclosure may include the technology that utilizes both the hardware-based approach and the software-based approach, they are not intended to exclude the software-based approach.

As used in the following description, the terms referring to a signal (e.g., packet, message, signal, information, signaling), the terms referring to a resource (e.g. section, symbol, slot, subframe, radio frame, subcarrier, resource element (RE), resource block (RB), bandwidth part (BWP), opportunity), the terms referring to an operation state (e.g., step, operation, procedure), the terms referring to data (e.g. packet, message, user stream, information, bit, symbol, codeword), the terms referring to a channel, the terms referring to a network entity (DU (distributed unit), RU (radio unit), CU (central unit), CU-CP (control plane), CU-UP (user plane), O-DU (O-RAN (open radio access network) DU), O-RU (O-RAN RU), O-CU (O-RAN CU), O-CU-UP (O-RAN CU-CP), O-CU-CP (O-RAN CU-CP)), the terms referring to components of an apparatus or device, or the like are only used for convenience of description in the disclosure. Therefore, the disclosure is not limited to those terms described below, and other terms having the same or equivalent technical meaning may be used therefor. Further, as used herein, the terms such as '~module', '~unit', '~section', '~part', '~body', or the like may refer to at least one shape of structure or a unit for processing a certain function.

Further, throughout the disclosure, an expression such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression such as 'above', a condition described as 'less than or equal to' may be replaced with an expression such as 'below', and a condition described as 'more than or equal to and below' may be replaced with 'above and less than or equal to', respectively. Furthermore, hereinafter, 'A' to 'B' may refer, for example, to at least one of the elements from A (including A) to B (including B). Hereinafter, 'C' and/or 'D' may refer, for example, to including at least one of 'C' or 'D', that is, {'C', 'D', or 'C' and 'D'}.

The disclosure describes various embodiments using terms used in various communication standards (e.g., 3rd Generation Partnership Project (3GPP), extensible radio access network (xRAN), open-radio access network (O-RAN) or the like), but they are merely used as an example for explanation. The various embodiments of the disclosure may be easily modified even in other communication systems and applied thereto.

FIG. 1 is a diagram illustrating an example wireless communication system.

Referring to FIG. 1, it illustrates a base station 110 and a terminal 120 as a part of nodes using a wireless channel in a wireless communication system. Although FIG. 1 illustrates only one base station, the wireless communication system may further include another base station that is the same as or similar to the base station 110.

The base station 110 may refer to and include a network infrastructure that provides wireless access to the terminal 120. The base station 110 may have a coverage defined based on a range capable of transmitting a signal. In addition to the term 'base station', the base station 110 may be referred to as 'access point (AP), 'eNodeB (eNB)', '5th generation node', 'next generation nodeB (gNB)', 'wireless point', 'transmission/reception point (TRP)', or any other terms having the same or equivalent meaning thereto.

The terminal 120, may include and refer to a device used by a user, may perform communications with the base station 110 via a wireless channel. A link from the base station 110 to the terminal 120 may be referred to as a downlink (DL), and a link from the terminal 120 to the base station 110 is referred to as an uplink (UL). Further, although not shown in FIG. 1, the terminal 120 and other terminals may perform communications with each other through the wireless channel. In this context, a link between the terminal 120 and another terminals (device-to-device link, D2D) is referred to as a side link, and the side link may be used mixed with a PC5 interface. In some other embodiments, the terminal 120 may be operated without any involvement by a user. According to an embodiment, the terminal 120, which is a device that performs machine-type communication (MTC), may not be carried by a user. Further, according to an embodiment, the terminal 120 may be a narrowband (NB)-Internet of things (IoT) device.

The terminal 120 may be referred to as 'user equipment (UE), 'customer premises equipment (CPE)', 'mobile station', 'subscriber station', 'remote terminal', 'wireless terminal', 'electronic device', 'user device', or the like, or any other term having the same or equivalent technical meaning thereto.

The base station 110 may perform beamforming with the terminal 120. The base station 110 and the terminal 120 may transmit and receive radio signals in a relatively low frequency band (e.g., FR 1 (frequency range 1) of NR). Further, the base station 110 and the terminal 120 may transmit and receive radio signals in a relatively high frequency band (e.g., FR 2 of NR (or FR 2-1, FR 2-2, FR 2-3), FR 3 of NR, or a millimeter wave (mmWave) band (e.g., 28 GHz, 30 GHz, 38 GHz, 60 GHz)). In order to enhance the channel gain, the base station 110 and the terminal 120 may perform beamforming. In this context, the beamforming may include transmission beamforming and reception beamforming. The base station 110 and the terminal 120 may assign directivity to a transmission signal or a reception signal. To this end, the base station 110 and the terminal 120 may select serving beams by means of a beam search or beam management procedure. After the serving beams are selected, subsequent communication may be performed through a resource having a QCL relationship with a resource that has transmitted the serving beams.

If the large-scale characteristics of a channel carrying symbols on a first antenna port can be inferred from a channel carrying symbols on a second antenna port, the first antenna port and the second antenna port may be evaluated to be in such a QCL relationship. For example, the large-scale characteristics may include at least one of delay spread, Doppler spread, Doppler shift, average gain, average delay, or spatial receiver parameters.

Although FIG. 1 describes that both the base station 110 and the terminal 120 perform beamforming, embodiments of the disclosure are not necessarily limited thereto. In various example embodiments, the terminal may or may not perform beamforming. Likewise, the base station may or may not perform beamforming. In other words, only either one of the base station and the terminal may perform beamforming, or none of the base station and the terminal may perform beamforming.

In the disclosure, a beam that refers, for example, to a spatial flow of a signal in a wireless channel may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE such as e.g., a CSI-RS resource, an SRS-resource, or the like may be used, and such a configuration may include information associated with a beam. Beam-associated information may refer to whether a corresponding configuration (e.g., CSI-RS resource) uses the same spatial domain filter as other configuration (e.g., another CSI-RS resource in the same CSI-RS resource set) or uses a different spatial domain filter, or with which reference signal it is quasi-co-located (QCLed), or if it is QCLed, what type it is (e.g., QCL type A, B, C, or D).

Conventionally, in a communication system with a relatively large cell radius of base station, each base station has been installed such that the respective base station includes functions of a digital processing unit (or distributed unit (DU)) and a radio frequency (RF) processing unit (or radio unit (RU)). However, as high-frequency bands are used in 4G ($4^{th}$ generation) systems and/or its subsequent communication systems (e.g., 5G) and the cell coverage of a base station decreased, the number of base stations to cover a certain area has increased. Thus, it led to more increased burden of the initial installation cost for communication providers to install more base stations. In order to minimize and/or reduce the installation costs of the base stations, a structure has been proposed in which a DU and an RU of a base station are separated so that one or more RUs are connected to one DU through a wired network, and one or more RUs geographically distributed to cover a specific area are arranged. Hereinafter, examples of deployment structure and expansion of base stations according to various embodiments of the disclosure will be described in greater detail with reference to FIGS. 2A to 2B.

Figure 2A:
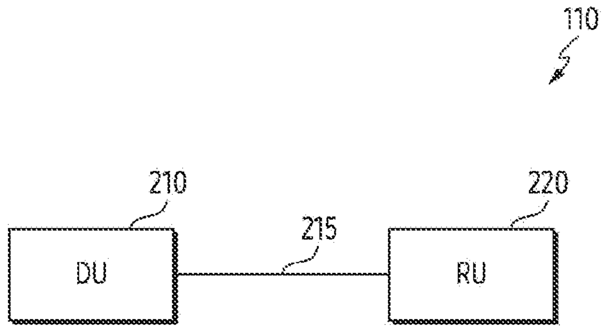
FIG. 2A is a block diagram illustrating an example fronthaul interface.

FIG. 2A is a block diagram illustrating an example fronthaul interface. A fronthaul may refer, for example, to a link for entities between a wireless LAN and a base station, as opposed to a backhaul for a link between a base station and a core network. Although FIG. 2A illustrates an example of a fronthaul structure between the DU 210 and one RU 220, it is only for convenience of description and the disclosure is not limited thereto. In other words, an embodiment of the disclosure may also be applied to a fronthaul structure between one DU and a multiplicity of RUs. For example, an embodiment of the disclosure may be applied to a fronthaul structure between one DU and two RUs. Further, an embodiment of the disclosure may be also applied to a fronthaul structure between one DU and three RUs.

Referring to FIG. 2A, the base station 110 may include a DU 210 and an RU 220. A fronthaul 215 between the DU 210 and the RU 220 may be operated through an $F_x$ interface. For the operation of the fronthaul 215, an interface such as e.g., an enhanced common public radio interface (eCPRI) or a radio over ethernet (ROE) may be used.

Along with further development of the communication technology, the mobile data traffic has increased a great deal, and thus, the bandwidth requirement demanded by the fronthaul between the digital unit and the radio unit has also increased significantly. In a deployment such as a centralized/cloud radio access network (C-RAN), the DU may be implemented to perform the functions for packet data convergence protocol (PDCP), radio link control (RLC), media access control (MAC), and physical (PHY), and the RU may be implemented to further perform the functions for a PHY layer in addition to the radio frequency (RF) function.

The DU 210 may serve as an upper layer of function of a wireless network. For example, the DU 210 may perform a function of a MAC layer and/or part of a PHY layer. Here, the part of the PHY layer, which is performed at a higher level of the functions of the PHY layer, may include, for example, channel encoding (or channel decoding), scrambling (or descrambling), modulation (or demodulation), or layer mapping (or layer de-mapping). According to an embodiment, in case that the DU 210 conforms to the O-RAN standard, it may be referred to as an O-DU (O-RAN DU). The DU 210 may be represented replaced by a first network entity for a base station (e.g., gNB) in embodiments of the disclosure, as occasion demands.

The RU 220 may serve as a lower layer of function of a wireless network. For example, the RU 220 may perform part of the PHY layer and/or the RF function. Here, the part of the PHY layer, which is performed at a relatively lower level than the DU 210 amongst functions of the PHY layer, may include, for example, iFFT transformation (or FFT transformation), CP insertion (CP removal), and digital beamforming. An example of such a specific function split will be described in more detail with reference to FIG. 4. The RU 220 may be referred to as 'access unit (AU)', 'access point (AP)', 'transmission/reception point (TRP)', 'remote radio head (RRH)', 'radio unit (RU)', or any other terms having an equivalent technical meaning thereto. According to an embodiment, in case that the RU 220 conforms to the O-RAN standard, it may be referred to as an O-RU (O-RAN RU). The RU 220 may be represented replaced by a second network entity for a base station (e.g., gNB) in embodiments of the present disclosure, as occasion demands.

Although FIG. 2A illustrates that the base station 110 includes the DU 210 and the RU 220, the embodiments of the disclosure are not limited thereto. The base station according to embodiments may be implemented with a distributed deployment according to a centralized unit (CU) configured to perform a function of upper layers (e.g., packet data convergence protocol (PDCP), radio resource control (RRC), etc.) of an access network, and a distributed unit (DU) configured to perform a function of a lower layer. In this context, the distributed unit (DU) may include a digital unit (DU) and a radio unit (RU) of FIG. 1. Between a core network (e.g., 5G core (5GC) or next generation core (NGC) network) and a radio access network (RAN), the base station may be implemented with a deployment disposed in the order of CU, DU, and RU. An interface between the CU and the distributed unit (DU) may be referred to as an F1 interface.

The centralized unit (CU) may be connected to one or more DUs to act as an upper layer of function than the DU. For example, the CU may act as the functions of radio resource control (RRC) and packet data convergence protocol (PDCP) layers, and the DU and the RU may act as for the functions of lower layers. The DU may perform some functions (high PHY) of the radio link control (RLC), the media access control (MAC), and the physical (PHY) layers, and the RU may be responsible for the remaining functions (low PHY) of the PHY layer. Further, for example, the digital unit (DU) may be included in the distributed unit (DU) according to implementation of a distributed deployment of the base stations. Hereinafter, unless otherwise defined, description will be made of the operations of the digital unit (DU) and the RU, but it is to be noted that various embodiments of the disclosure may be applied to both the deployment of base stations including the CU or the deployment with the DU being directly connected to the core network (e.g., being implemented incorporated into a base station (e.g., NG-RAN node) where the CU and the DU be one entity).

Figure 2B:
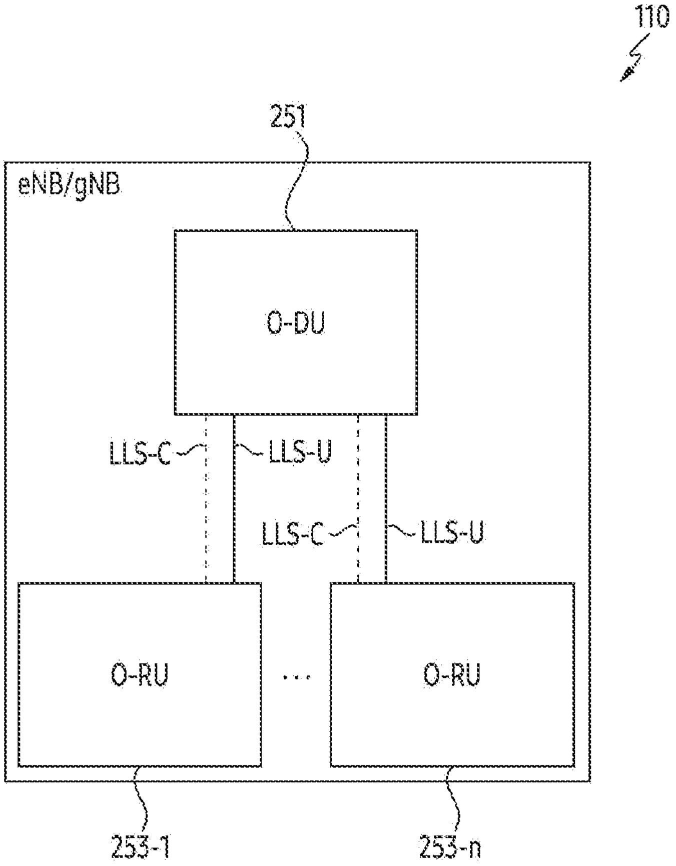
FIG. 2B is a block diagram illustrating an example fronthaul interface of an O-RAN (open radio access network)

FIG. 2B is a block diagram illustrating an example fronthaul interface of an O-RAN (open-radio access network), wherein an eNB or a gNB is illustrated as a base station 110 according to a distributed deployment.

Referring to FIG. 2B, the base station 110 may include an O-DU 251 and O-RUs (253-1, . . . , 253-*n*). Hereinafter, for convenience of explanation, the operation and function of the O-RU 253-1 may be understood with an explanation for each of other O-RUs (e.g., O-RU 253-*n*).

The DU 251 is a logical node including functions except for the functions exclusively assigned to O-RU 253-1 amongst the functions of the base station (e.g., eNB, gNB) according to FIG. 4 to be described later. The O-DU 251 may control the operation of the O-RUs (253-1, . . . , 253-*n*). The O-DU 251 may be referred to as a lower layer split (LLS) central unit (CU). The O-RU 253-1 is a logical node including a subset amongst the functions of the base station (e.g., eNB, gNB) according to FIG. 4 to be described later. A real-time aspect of control plane (C-plane) communication and user plane (U-plane) communication with the O-RU 253-1 may be controlled by the O-DU 251.

The DU 251 may perform communication with the O-RU 253-1 via an LLS interface. The LLS interface corresponds to the fronthaul interface. The LLS interface may refer, for example, to a logical interface between the O-DU 251 and the O-RU 253-1, using a lower layer functional split (e.g., intra-PHY-based function split). The LLS-C between the O-DU 251 and the O-RU 253-1 provides a C-plane through the LLS interface. The LLS-U between the O-DU 251 and the O-RU 253-1 provides a U-plane through the LLS interface.

In FIG. 2B, the entities of the base station 110 may be referred to as O-DU and O-RU to describe O-RAN. However, such a naming is not to be construed to limit the embodiments of the present disclosure thereto. In the embodiments described with reference to FIGS. 3A to 12, the operations of the DU 210 may be performed by the O-DU 251, of course. The description of the DU 210 may be also applied to the O-DU 251. Likewise, in the embodiments described in greater detail below with reference to FIGS. 3A to 10B, the operations of the RU 220 may be performed by the O-RU 253-1, of course. The description of the RU 220 may be also applied to the O-DU 253-1.

Figure 3A:
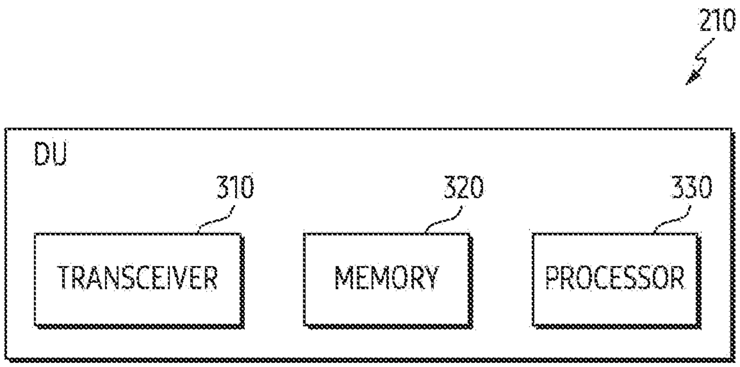
FIG. 3A is a block diagram illustrating an example configuration of a distributed unit (DU)

FIG. 3A is a block diagram illustrating an example configuration of a distributed unit (DU). The configuration illustrated in FIG. 3A may be understood as a configuration of the DU 210 of FIG. 2A (or O-DU 251 of FIG. 2B), which may be a part of the base station. As used herein, the terms such as '~module', '~unit', or '~part' may refer, for example, to a unit for processing at least one function or operation, which may be implemented by hardware, software, or a combination of hardware and software.

Referring to FIG. 3A, the DU 210 includes a transceiver 310, a memory 320, and a processor (e.g., including processing circuitry) 330.

The transceiver 310 may perform functions for transmitting and/or receiving signals in a wired communication environment. The transceiver 310 may include a wired interface for controlling a direct connection between an apparatus and another apparatus via a transmission medium (e.g., copper wire, optical fiber, or the like). For example, the transceiver 310 may transmit an electrical signal to other device through a copper wire or perform conversion between an electrical signal and an optical signal. The DU 210 may communicate with a radio unit (RU) via the transceiver 310. The DU 210 may be connected to a core network or a distributed CU via transceiver 310.

The transceiver 310 may perform the functions for transmitting and receiving signals in a wireless communication environment. For example, the transceiver 310 may perform a function for conversion between a baseband signal and a bit string according to a physical layer standard of a communication system. For example, upon data transmission, the transceiver 310 generates complex symbols by encoding and modulating a transmit bit string. Further, upon data reception, the transceiver 310 restores the received bit string through demodulation and decoding of the baseband signal. Further, the transceiver 310 may include a plurality of transmission/reception paths. Furthermore, according to an embodiment, the transceiver 310 may be connected to a core network or connected to other nodes (e.g., integrated access backhaul (IAB).

The transceiver 310 may be configured to transmit and receive signals. For example, the transceiver 310 may transmit a management plane (M-plane) message. For example, the transceiver 310 may transmit a synchronization plane (S-plane) message. For example, the transceiver 310 may transmit a control plane (C-plane) message. For example, the transceiver 310 may transmit a user plane (U-plane) message. For example, the transceiver 310 may receive the U-plane message. Although only the transceiver 310 is illustrated in FIG. 3A, the DU 210 may include two or more transceivers, according to an embodiment.

The transceiver 310 may be configured to transmit and receive signals as described above. As such, all or at least part of the transceiver 310 may be also referred to as a communication unit, a transmission unit, a reception unit, or a transmission/reception unit, each including various communication circuitry. Further, throughout the following description, the transmission and/or reception performed via a wireless channel may refer, for example, to the aforementioned process being performed by the transceiver 310.

Although not illustrated in FIG. 3A, the transceiver 310 may further include a backhaul transceiver for connection with a core network or another base station. The backhaul transceiver provides an interface for performing communication with other nodes in the network. In other words, the backhaul transceiver converts a bit string transmitted from a base station to another node, for example, other access node, other base station, a higher layer node, a core network or the like, into a physical signal and converts the physical signal received from the other node into a bit string.

The memory 320 stores data such as a basic program, application programs, and setting information for the overall operation of the DU 210. The memory 320 may be referred to as a storage unit. The memory 320 may be configured with a volatile memory, a non-volatile memory, or a combination of a volatile memory and a non-volatile memory. Further, the memory 320 provides stored data according to a request of the processor 330.

The processor 330 may include various processing circuitry and control the overall operations of the DU 210. The processor 380 may be referred to as a controller. For example, the processor 330 transmits and receives signals via the transceiver 310 (or via a backhaul communication unit). Further, the processor 330 records and reads data into/from the memory 320. Further, the processor 330 may perform functions of a protocol stack required by the communication standard. Although only the processor 330 is illustrated in FIG. 3A, the DU 210 may include two or more processors, according to an example of another implementation.

The configuration of the DU 210 illustrated in FIG. 3A is only of an example, and the configuration of the DU according to various example embodiments of the disclosure is not limited to the configuration illustrated in FIG. 3A. In various example embodiments, a portion of the configuration may be added, deleted, or changed.

Figure 3B:
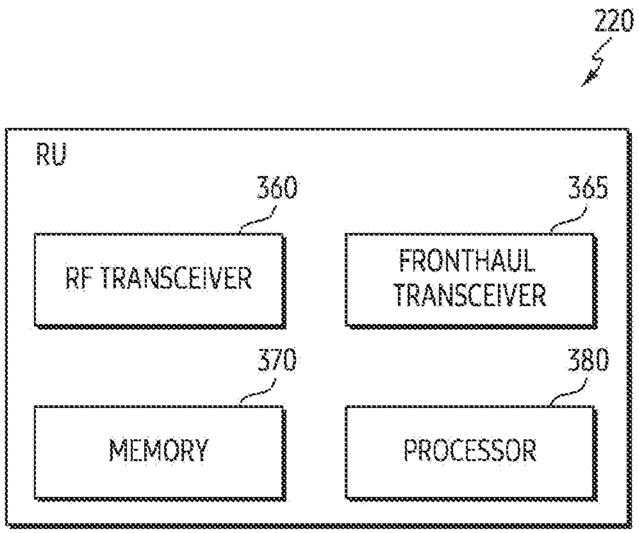
FIG. 3B is a block diagram illustrating an example configuration of a radio unit (RU)

FIG. 3B is a block diagram illustrating an example configuration of a radio unit (RU). The configuration illustrated in FIG. 3B may be understood as a configuration of the RU 220 of FIG. 2B or the O-RU 253-1 of FIG. 2B, which is a part of the base station. As used herein, the terms such as '~module', '~unit', or '~part' may refer, for example, a unit for processing at least one function or operation, which may be implemented by hardware, software, or a combination of hardware and software.

Referring to FIG. 3B, the RU 220 may include an RF transceiver 360, a fronthaul transceiver 365, a memory 370, and a processor (e.g., including processing circuitry) 380.

The RF transceiver 360 may perform the functions for transmitting and receiving signals through a wireless channel. For example, the RF transceiver 360 may up-convert a baseband signal into an RF band signal to transmit the RF band signal through an antenna, and down-convert an RF band signal received through the antenna into a baseband signal. For example, the RF transceiver 360 may include a transmission filter, a reception filter, an amplifier, a mixer, an oscillator, a DAC, an ADC, or the like.

The RF transceiver 360 may include a plurality of transmission/reception paths. Furthermore, the RF transceiver 360 may include an antenna unit. The RF transceiver 360 may include at least one antenna array configured with a plurality of antenna elements. In terms of hardware, the RF transceiver 360 may be configured with a digital circuit and an analog circuit (e.g., radio frequency integrated circuit (RFIC)). Here, the digital circuit and the analog circuit may be implemented in a single package. Further, the RF transceiver 360 may include a plurality of RF chains. The RF transceiver 360 may perform beamforming. The RF transceiver 360 may apply a beamforming weight to a signal in order to give a directivity according to the setting of the processor 380 to the signal for transmission and reception. According to an embodiment, the RF transceiver 360 may include a radio frequency (RF) block (or an RF unit).

According to an embodiment, the RF transceiver 360 may transmit and receive a signal over a radio access network. For example, the RF transceiver 360 may transmit a downlink signal. The downlink signal may include a synchronization signal (SS), a reference signal (RS) (e.g., cell-specific reference signal (CRS), DM(demodulation)-RS), system information (e.g., MIB, SIB, RMSI (remaining system information), OSI (other system information)), configuration messages, control information, or downlink data. Further, for example, the RF transceiver 360 may receive an uplink signal. The uplink signal may include a random access related signal (e.g., random access preamble: RAP) (or Msg1 (message 1), Msg3 (message 3)), a reference signal (e.g., sounding reference signal (SRS), DM-RS), a power headroom report (PHR) or the like. Although only the RF transceiver 360 is illustrated in FIG. 3B, the RU 220 may include two or more RF transceivers, according to an example of another implementation.

According to embodiments, the RF transceiver 360 may transmit RIM-RS. The RF transceiver 360 may transmit a first type of RIM-RS (e.g., RIM-RS type 1 of 3GPP) for notifying detection of far-field interference. The RF transceiver 360 may transmit a second type of RIM-RS (e.g., RIM-RS type 2 of 3GPP) for notifying presence or absence of the far-field interference.

The fronthaul transceiver 365 may transmit and receive a signal. According to an embodiment, the fronthaul transceiver 365 may transmit and receive the signal on a fronthaul interface. For example, the fronthaul transceiver 365 may receive a management plane (M-plane) message. For example, the fronthaul transceiver 365 may receive a synchronization plane (S-plane) message. For example, the fronthaul transceiver 365 may receive a control plane (C-plane) message. For example, the fronthaul transceiver 365 may transmit a user plane (U-plane) message. For example, the fronthaul transceiver 365 may receive the user plane message. Although only the fronthaul transceiver 365 is illustrated in FIG. 3B, the RU 220 may include two or more fronthaul transceivers, according to an example of another implementation.

The RF transceiver 360 and the fronthaul transceiver 365 may transmit and receive signals as described above. As such, all or at least part of the RF transceiver 360 and the fronthaul transceiver 365 may be referred to as 'communication unit', 'transmission unit', 'reception unit', or 'transceiver unit'. Further, throughout the following description, the transmission and/or reception performed via a wireless channel may refer, for example to the aforementioned process being performed by the transceiver 310.

The memory 370 stores data such as a basic program, application programs, and setting information for the overall operation of the RU 220. The memory 370 may be referred to as a storage unit. The memory 370 may be configured with a volatile memory, a nonvolatile memory, or a combination of a volatile memory and a nonvolatile memory. Further, the memory 370 provides stored data according to a request of the processor 380. According to an embodiment, the memory 370 may include a memory for storing conditions, instructions, or setting values related to the SRS transmission scheme.

The processor 380 may include various processing circuitry and control the overall operations of the RU 220. The processor 380 may be referred to as a controller. For example, the processor 380 transmits and receives signals via the RF transceiver 360 or the fronthaul transceiver 365. Further, the processor 380 writes and reads data into/from the memory 370. Further, the processor 380 may perform the functions of a protocol stack required by the communication standard. Although only the processor 380 is illustrated in FIG. 3B, the RU 220 may include two or more processors, according to another implementation example. The processor 380 may include a storage space for storing instructions/codes at least temporarily resident in the processor 380, the instructions/codes being an instruction set or code stored in the memory 370, or may be part of a circuitry configuring the processor 380. Further, the processor 380 may include various communication modules for performing the communication. The processor 380 may control the RU 220 to perform operations according to the following embodiments of the disclosure.

The configuration of the RU 220 illustrated in FIG. 3B is only an example, and the example of the RU according to various example embodiments of the disclosure is not limited to the configuration illustrated in FIG. 3B. In various configurations, some of the configuration may be subject to addition, deletion, or change.

Figure 4:
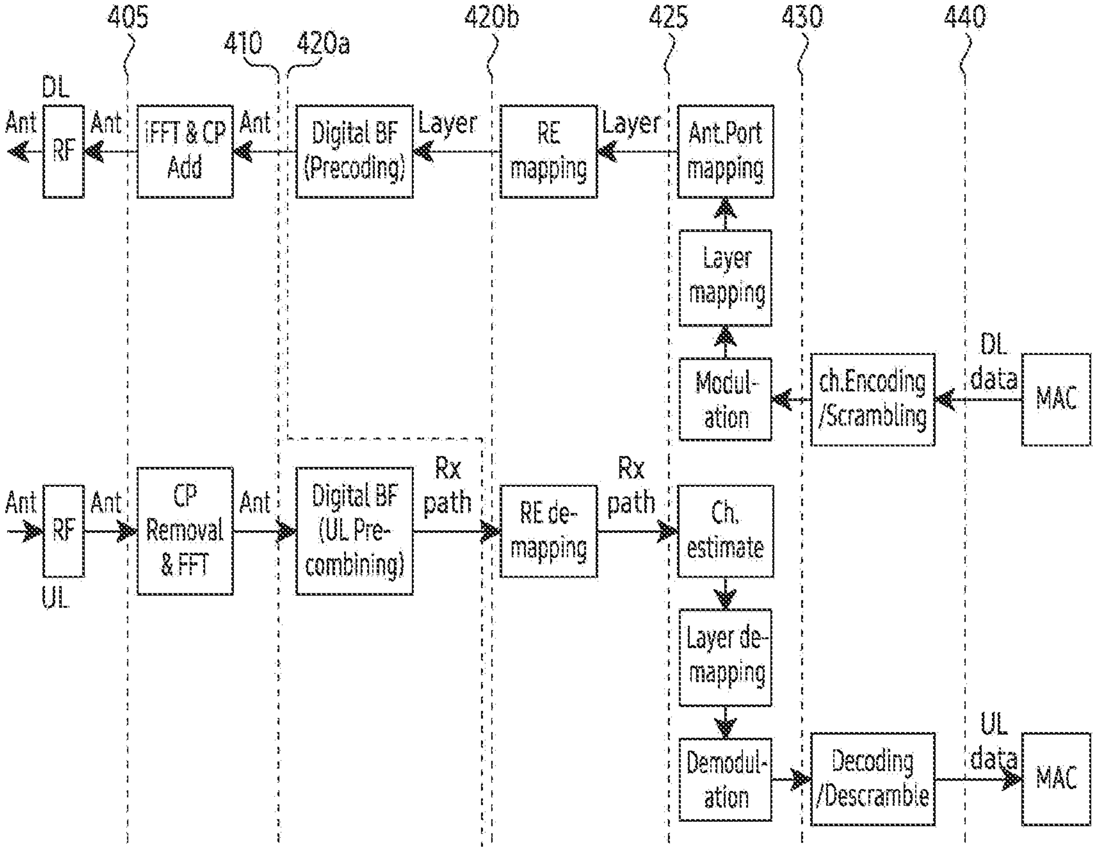
FIG. 4 is a diagram illustrating an example of a function split in between a DU and an RU.

FIG. 4 is a diagram illustrating an example of a function split in between a DU and an RU. Along with latest developments in wireless communication technologies (e.g., the introduction of 5G communication system or NR (new radio) communication system), the frequency band used has increased even more. Further, as the cell radius of a base station becomes very small, the number of RUs requiring installation further increases. Furthermore, in the 5G communication system, the amount of data transmission has greatly increased by 10 times or more, and thus, the data transmission capacity of a wired network transmitted to a fronthaul has significantly increased. Therefore, due to the above-described factors, the initial installation costs for the wired network in the 5G communication system may increase very significantly. As such, in order to decrease the transmission capacity of the wired network and reduce the installation costs for the wired network, the 'function split' may be used to reduce the transmission capacity of the fronthaul by transferring some functions of a modem of a DU to a RU.

To reduce the burden on the DU, a role of the RU, which is responsible for the existing RF function, may be extended to some function of the physical layer. The higher layer of functions the RU performs, the more the throughput of the RU may increase to increase the transmission bandwidth at the fronthaul, and simultaneously, lower constraint of the latency requirement due to response processing. Meanwhile, the higher layer of function the RU performs, the less virtualization gain it obtains and the more the size, weight, and cost of the RU increase. Therefore, it is required to implement the optimal function split in consideration of the trade-off of the above-described advantages and disadvantages.

Referring to FIG. 4, the function splits in the physical layer below the MAC layer are illustrated. In the case of a downlink (DL) transmitting signals to a terminal over a wireless network, a base station may sequentially perform channel encoding/scrambling, modulation, layer mapping, antenna mapping, RE mapping, digital beamforming (e.g., precoding), iFFT transformation/CP insertion, and RF conversion. In the case of uplink (UL) receiving signals from a terminal over a wireless network, a base station may sequentially perform RF conversion, FFT transformation/CP removal, digital beamforming (e.g., pre-combining), RE de-mapping, channel estimation, layer de-mapping, demodulation, decoding/de-scrambling. The function split of uplink functions and downlink functions may be defined in various types by the needs between the vendors, the discussion on the standards, and so on, according to the aforementioned trade-off.

In the first function split 405, the RU performs the RF function and the DU performs the PHY function. In the first function split, the PHY function in the RU is not substantially implemented, and it may be referred to as Option 8, for example. In the second function split 410, the RU performs iFFT transformation/CP addition in the DL of the PHY function and FFT transformation/CP removal in the UL, and the DU performs the remaining PHY functions. For example, the second function split 410 may be referred to as Option 7-1. In the third function split 420*a*, the RU performs iFFT transformation/CP addition in DL of the PHY function and FFT transformation/CP removal and digital beamforming in the UL, and the DU performs the remaining PHY functions. For example, the third function split 420*a* may be referred to as Option 7-2x Category A. In a fourth function split 420*b*, the RU performs up to digital beamforming in both the DL and the UL, and the DU performs the upper PHY functions after the digital beamforming. For example, the fourth function split 420*b* may be referred to as Option 7-2x Category B. In the fifth function split 425, the RU performs up to RE mapping (or RE de-mapping) in both the DL and the UL, and the DU performs the upper PHY functions after the RE mapping (or RE de-mapping). For example, the fifth function split 425 may be referred to as Option 7-2. In the sixth function split 430, the RU performs up to modulation (or demodulation) in both the DL and the UL, and the DU performs the upper PHY functions after the modulation (or demodulation). For example, the sixth function split 430 may be referred to as Option 7-3. In the seventh function split 440, the RU performs up to encoding/scrambling (or decoding/de-scrambling) in both the DL and the UL, and the DU performs the upper PHY functions following the modulation (or demodulation). For example, the seventh function split 440 may be referred to as Option 6.

According to an embodiment, in the case where a large amount of signal processing is expected as in FR 1 MMU, the function split (e.g., fourth function split 420*b*) at a relatively upper layer may be required to reduce the fronthaul capacity. Further, the function split at a too high layer (e.g., the sixth function split 430) may lead to more complicated control interface and cause a significant burden on the implementation of the RU due to inclusion of multiple PHY processing blocks in the RU, and therefore, an appropriate function split may be required depending on the deployment and the implementation scheme of the DU and RU.

According to an embodiment, in the case where it is not possible to process the precoding of data received from the DU (e.g., when the precoding capability of the RU is limited), the third function split 420*a* or its lower function split (e.g., the second function split 410) may be applied. In the case where it is capable of processing the precoding of data received from the DU, the fourth function split 420*b* or its higher function split (e.g., the sixth function split 430) may be applied.

Hereinafter, in the present disclosure, the example embodiments are described based on the third function split 420*a* (which may be referred to as category A or CAT-A) or the fourth function split 420*b* (which may be referred to as category B or CAT-B), for performing beamforming process in the RU, unless otherwise defined. The O-RAN specification distinguishes the type of O-RU, depending on whether the precoding function is located either on an O-DU interface or on an O-RU interface. An O-RU (e.g., with low complexity) in which no precoding is performed may be referred to as a CAT-A O-RU. The O-RU in which the precoding is performed may be referred to as a CAT-B O-RU.

Hereinafter, an upper PHY may refer, for example, to a physical layer processing carried out in a DU of a fronthaul interface. For example, the upper PHY may include FEC encoding/decoding, scrambling, and modulation/demodulation. Hereinafter, a lower PHY may refer, for example, to a physical layer processing carried out in a RU of a fronthaul interface. For example, the lower PHY may include FFT/iFFT, digital beamforming, or physical random access channel (PRACH) extraction and filtering. However, it is to be noted that the aforementioned criteria do not exclude embodiments implemented through other function splits. Functional configuration, signaling, or operations to be described below may be described on the basis of the third function split 420*a* or the fourth function split 420*b*, but they may also apply to other function splits.

Embodiments of the disclosure describe as an example the specifications of eCPRI and O-RAN as a fronthaul interface, when transmitting a message between a DU (e.g., DU 210 in FIG. 2A) and an RU (e.g., RU 220 in FIG. 2A). The Ethernet payload of the message may include an eCPRI header, an O-RAN header, and additional fields. Hereinafter, various example embodiments of the disclosure may be described using the standard terms of eCPRI or O-RAN, but it is to be noted that any other expressions having the same or equivalent meaning to a corresponding term may be used in substitution in the various embodiments of the disclosure.

For a transport protocol of the fronthaul, Ethernet and eCPRI may be used which are easy to share with the network. An eCPRI header and an O-RAN header may be included in the Ethernet payload. The eCPRI header may be located at a front-end of the Ethernet payload. The contents of the eCPRI header may be as follows.

- ecpriVersion (4 bits): This parameter indicates an eCPRI protocol version.
- ecpriReserved (3 bits): This parameter is reserved for further use of eCPRI.
- ecpriConcatenation (1 bit): This parameter indicates when eCPRI concatenation is in use.
- ecpriMessage (1 byte): This parameter indicates a type of service carried by a message type. For example, the parameter indicates an IQ (in-phase/quadrature-phase) data message, a real-time control data message, or a transmission network delay measurement message.
- ecpriPayload (2 bytes): This parameter indicates a byte size of a payload portion of the eCPRI message.
- ecpriRtcid/ecpriPcid (2 bytes): This parameter is an eAxC (extended antenna-carrier) identifier (eAxC ID), identifying specific data flow related to each C-plane (ecpriRtcid) or U-plane (ecpriPcid) message.
- ecpriSeqid (2 bytes): This parameter provides unique message identification and sequence in two levels. A first octet of this parameter is a sequence ID used to identify the sequence of messages within eAxC message stream, and the sequence ID is used to verify that all the messages have been received and to rearrange out-of-order messages. A second octet of this parameter is a sub sequence ID. This sub sequence ID is used to verify the sequence and implement its rearrangement, when a radio-transport-level fragmentation (eCPRI or IEEE-1914.3) occurs.
- eAxC identifier (ID): This ID includes a band and sector identifier ('BandSector_ID'), a component carrier identifier ('CC_ID'), a spatial stream identifier ('RU_Port_ID'), and a distributed unit identifier ('DU_Port_ID'). Bit allocation of eAxC ID may be classified as follows.
- DU_port ID: This ID is used to distinguish processing units in O-DU (e.g., other baseband cards). It is expected that the O-DU will allocate bits for the DU_port ID and the O-RU will attach the same value to the UL U-plane message carrying the same sectionId data.
- BandSector_ID: This ID is an aggregated cell identifier (band and sector classification supported by O-RU).
- CC_ID: This ID is used to distinguish carrier components supported by O-RU.
- RU_port ID: This ID specifies logical flows such as e.g., data layers or spatial streams, and logical flows such as signal channels requiring special antenna assignment, such as e.g., separate numerologies (e.g., PRACH) or SRS.

Application protocol of the fronthaul may include a control plane (C-plane), a user plane (U-plane), a synchronization plane (S-plane), and a management plane (M-plane).

The control plane may be configured to provide scheduling information and beamforming information via a control message. The control plane may refer, for example, to real-time control between a DU and a RU. The user plane may include IQ sample data transmitted between the DU and the RU. The user plane may include downlink data (IQ data or SSB/RS), uplink data (IQ data or SRS/RS), or PRACH data of the user. The weight vector of the aforementioned beamforming information may be multiplied by a user's data. The synchronization plane generally typically refers to traffic between the DU and the RU for a synchronization controller (e.g., IEEE grandmaster). The synchronization plane may be related to timing and synchronization. The management plane may refer, for example, to non-real-time control between the DU and the RU. The management plane may be related to an initial setup, a non-real-time reset, or a reset, or a non-real-time report.

A message of the control plane, for example, a C-plane message may be encapsulated based on a two-layer header approaching scheme. The first layer may include an eCPRI common header or an IEEE 1914.3 common header, including fields used to indicate a message type. The second layer is an application layer including fields necessary for control and synchronization. A section in the application layer may define the characteristics of U-plane data transmitted or received in a beam with one pattern ID. The section types supported in the C-plane are as follows.

The section type may indicate the use of the control message transmitted in the control plane. For example, the use per section type may be as follows.

1) sectionType=0: This is used to indicate resource blocks or symbols that are not used in DL or UL.
2) sectionType=1: This is used for most DL/UL radio channels, wherein the term 'most' indicates the channels that do not require time or frequency offset, as those required for mixed neuronal channels.
3) sectionType=2: This is reserved for further use.
4) sectionType=3: This is for a PRACH and mixed-numerology channel, and the channel requiring a time or frequency offset or different from the nominal SCS value(s).
5) sectionType=4: This is reserved for further use.
6) sectionType=5: This is UE scheduling information, delivering UE scheduling information so that the RU can perform real-time BF weight calculation (O-RAN optional BF scheme).
7) sectionType=6: This is for UE-specific channel information transmission, periodically delivering the UE channel information so that the RU can perform real-time BF weight calculation (O-RAN optional BF scheme).
8) sectionType=7: This is used to support LAA
9) sectionType=8: This is used for ACK/NACK feedback to provide ACK/NACK feedback for section descriptions of C-plane messages from RU to DU.

Figure 5:
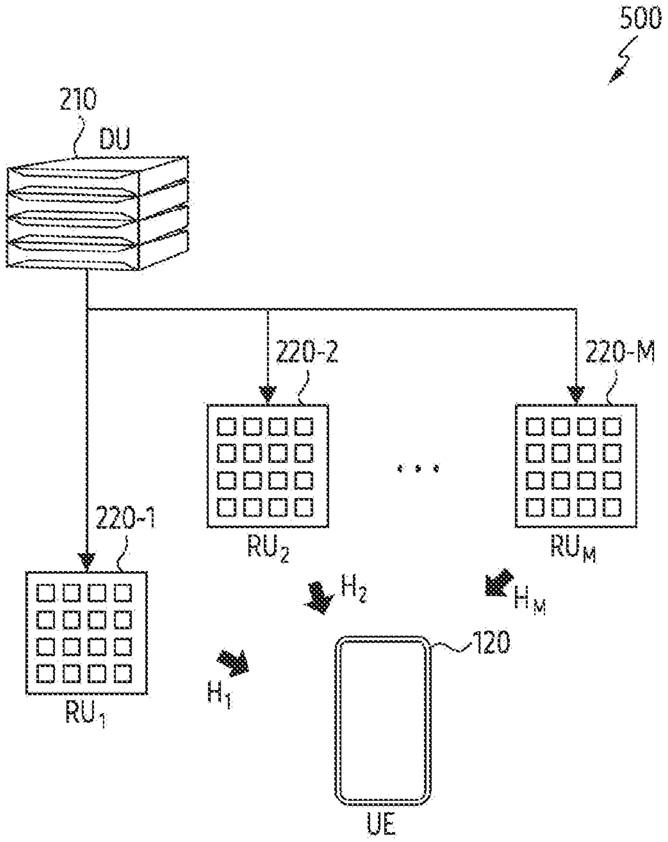
FIG. 5 is a diagram illustrating an example of data transmission according to a joint transmission (JT) technique.

FIG. 5 is a diagram illustrating an example of data transmission according to a joint transmission (JT) technique. The same reference number may be referred to for the same description between the drawings. As communication technology developed, various MIMO techniques were introduced. As one of the various MIMO techniques, the joint transmission (JT) technique, which may refer to a cooperative communication technique of a network, may be used. In a distributed network environment in which multiple RUs (e.g., a RU 220) are connected to one DU (e.g., a DU 210), the JT technique may be used. For example, the JT technique may include multi-TRP (M-TRP) technique of 5G NR for transmitting data to UE (e.g., a terminal 120) through multiple TRPs. Also, for example, the JT technique may include a coordinated multi point (CoMP) technique for reducing interference and transmitting data through cooperation between base stations. The JT technique may include a coherent JT scheme and a non-coherent JT scheme.

Referring to FIG. 5, a distributed network 500 may include the DU 210 and RUs 220-1, 220-2, . . . , 220-M. For each of the RUs 220-1, 220-2, . . . , 220-M, a description of the RU 220 may be referenced. Each of the RUs 220-1, 220-2, . . . , 220-M may be connected to the DU 210 through a fronthaul interface.

The data transmission according to the JT technique may be performed through the RUs 220-1, 220-2, . . . , 220-M. The DU 210 may generate downlink data. The DU 210 may transmit the downlink data to each RU 220-*m* (m is an integer equal to or greater than 1 and equal to or less than M) through a U-plane message. RU 220-*i* may transmit the downlink data to the terminal 120. Each of the RUs 220-1, 220-2, . . . , 220-M may transmit the downlink data to the terminal 120. The terminal 120 may receive the downlink data from each RU of the RUs 220-1, 220-2, . . . , 220-M. For example, the reception signal of the terminal 120 may be represented as follows.

$$y=\sqrt{\frac{P}{M\cdot n_T}}\sum_{m=1}^{M}H_mW_mx+n \qquad \text{[Equation 1]}$$

y denotes the reception signal, $H_m$ denotes a channel between $m^{th}$ RU (e.g., the RU (220-*m*)) having a $n_R \times n_T$ dimension and the terminal 120, and $W_m$ denotes a beamforming weight and/or a precoding matrix in $n_T \times n_L$ dimensional $m^{th}$ RU(RU(220-*m*)). x is an $n_L \times 1$ input signal, n is an $n_R \times 1$ input signal and denotes a noise signal. P denotes the power of the transmission signal x.

Multiple-input single-out (MISO) that assumes single-layer transmission (or single-stream transmission) may be assumed. Assuming the beamforming weight of $n_R=1$ and maximum ratio transmission (MRT), the above equation may be represented as the following equation.

$$\begin{aligned} y &= \sqrt{\frac{P}{M\cdot n_T}}\sum_{m=1}^{M}h_mw_mx+n \\ &= \sqrt{\frac{P}{\|h\|_F^2}}\sum_{m=1}^{M}\|h_m\|_F^2x+n \end{aligned} \qquad \text{[Equation 2]}$$

Here, $$h=[h_1 \;\dots\; h_M],\; w_m=\frac{\sqrt{Mn_T}\,h_m^H}{\|h\|_F},$$

and $\|\cdot\|_F$ refer to Frobenius norm.

Assuming equal power allocation, when $R_{xx}=I_{n_T}$, the channel capacity may be represented as the following equation.

$$C_{eq}^{al}=\log_2\left\{1+\frac{\rho}{\|h\|_F^2}\left(\sum_{m=1}^{M}\|h_m\|_F^2\right)^2\right\}=\log_2\left\{1+\rho\sum_{m=1}^{M}\|h_m\|_F^2\right\} \qquad \text{[Equation 3]}$$

$$C_{eq}^{al}$$

denotes the channel capacity when all phases are aligned without phase mismatch on hardware between the RUs. 'al' may refer, for example, to 'aligned' hardware.

In case that there is the phase mismatch between the RUs 220-1, 220-2, . . . , 220-M, the channel capacity may be represented differently. For example, it may be assumed that there is no phase difference inside the RU. When the phase difference with the mth RU 220-*m* based on the first RU 220-1 is indicated by $\theta_{m,1}$, the Equation 2 may be represented as the following equation.

$$y = \sqrt{\frac{P}{\|h\|_F^2}} \sum_{m=1}^{M} e^{j\theta_{m,0}} \|h_m\|_F^2 x + n \quad \text{[Equation 4]}$$

Assuming a system in which the phase mismatch of hardware exists, the channel capacity $$C_{eq}^{mis}$$

in the distributed network 500 may be represented by the following equation.

$$C_{eq}^{mis} = \log_2\left\{1 + \frac{\rho}{\sum_{m=0}^{M-1} \alpha_m}\left(\sum_{m=0}^{M-1} \alpha_m^2 + \sum_{n \neq m}^{M-1} \sum_{m=0}^{M-1} \cos(\theta_{m,0} - \theta_{n,0}) \alpha_m \alpha_n\right)\right\} \quad \text{[Equation 5]}$$

$$\alpha_m = \|h_m\|_F^2, \text{ and } \|h\|_F^2 = \sum_{m=0}^{M-1} \alpha_m \cdot \theta_{m,n} = \theta_{m,1} - \theta_{n,1}, \text{ and } \theta_{m,n} = -\theta_{n,m}.$$

Comparing the Equation 3 and the Equation 5, it can be confirmed that it is established in case that $$C_{eq}^{al} \geq C_{eq}^{mis}$$

and the equal sign is cos $\theta_{m,n}$=1. $\theta_{m,n}$=0 may refer, for example, to there being no phase difference between the RUs. In other words, if the phase alignment between the RUs is performed, it may be confirmed that a target channel capacity (e.g., the $$C_{eq}^{al}$$

of Equation 3) may be achieved.

Based on the above-described analysis, in the present disclosure, in the distributed network environment, a technique for resolving the phase mismatch between the RUs 220-1, 220-2, . . . , 220-M is described. For example, in the present disclosure, a procedure for obtaining phase difference information between the RUs 220-1, 220-2, . . . , 220-M and performing the phase alignment based on the identified phase difference information is described. Also, for example, in the present disclosure, messages between DU and RU (e.g., M-plane message, C-plane message, U-plane message of O-RAN interface) for obtaining phase information from each of the RUs 220-1, 220-2, . . . , 220-M in the DU 210 and providing phase compensation to the RU and information of the messages are described.

Figure 6:
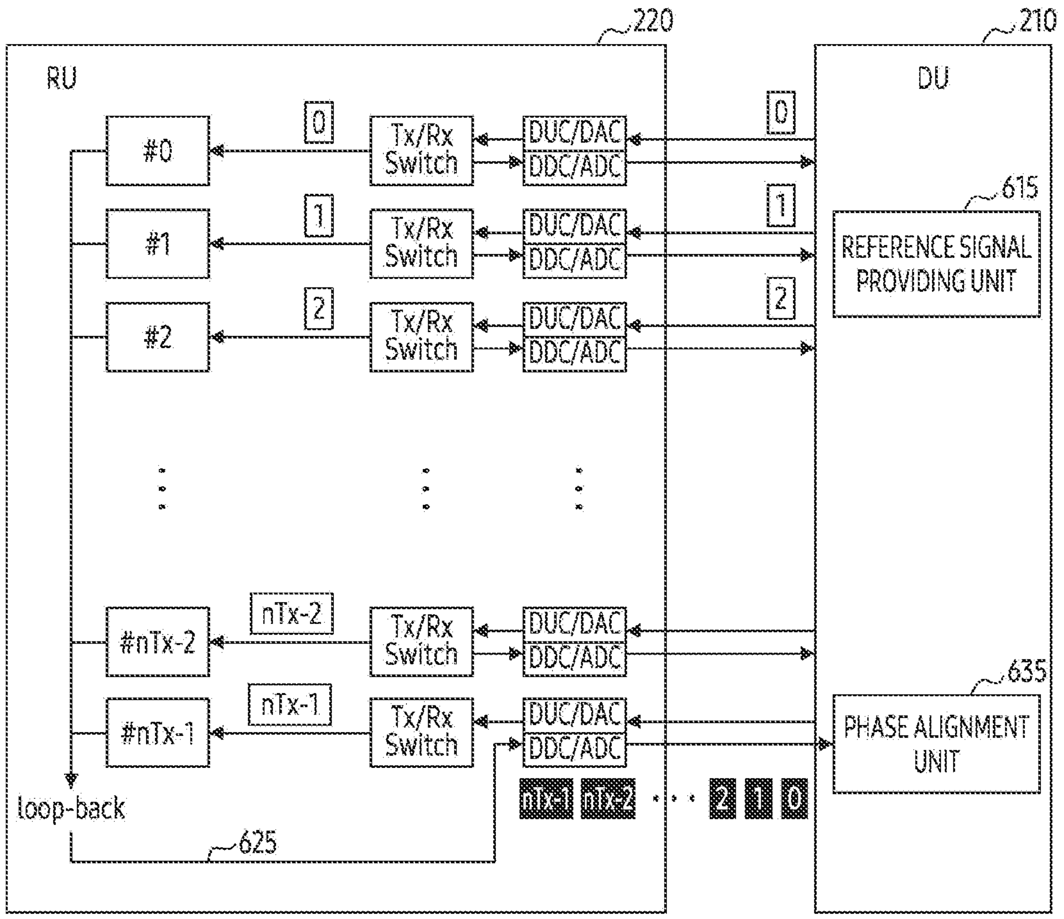
FIG. 6 is a block diagram illustrating an example of DU and RU for phase alignment.

FIG. 6 is a block diagram illustrating functional blocks of a DU (e.g., a DU 210) and an RU (e.g., an RU 220) for phase alignment. The same reference number may be referred to for the same description between the drawings. The RU 220 illustrates an example of one of RUs 220-1, 220-2, . . . , 220-M of FIG. 5 in distributed network 500.

Referring to FIG. 6, the DU 210 may include a reference signal providing unit 615. The reference signal providing unit 615 may include various circuitry and/or executable program instructions and generate a reference signal for each path of the RU 220. For example, the number of transmitters of the RU 220 may be nTx. The reference signal providing unit 615 may generate nTx number of reference signals. The DU 210 may transmit the generated reference signals to the RU 220. For example, the DU 210 may transmit a U-plane message including the reference signals to the RU 220. In FIG. 6, an example of generating the reference signal in the DU 210 and transmitting it to the RU 220 as data of the U-plane message is described, but embodiments of the present disclosure are not limited thereto. The DU 210 may provide the RU 220 with a parameter for generating the reference signal. The DU 210 provides only the parameter for generating the reference signal for each path to the RU 220, and the reference signal may be generated in the RU 220.

The RU 220 may include a conversion block, a switch block, and a transmitter for each path. The conversion block may include a digital up converter (DUC)/digital-to-analog converter (DAC) block for transmission and a digital down converter (DDC)/analog-to-digital converter (ADC) block for reception. The DUC/DAC block may up-convert a digital signal and may convert the up-converted digital signal into an analog signal. The DDC/ADC block may convert the analog signal into the digital signal and may down-convert the converted digital signal. The switch block may switch from a transmission path to a reception path or from the reception path to the transmission path. For example, the RU 220 may include nTx number of paths. The RU 220 may transmit the reference signals received from the DU 210 through transmitter #i (i is equal to or greater than 0 and equal to or less than nTx-1) across each transmission path. The RU 220 may transmit the reference signals through the transmitter #0 to the transmitter #nTx-1.

The RU 220 may include a feedback path 625. The RU 220 may loop back the transmitted reference signals through the feedback path 625. For example, the reference signals may be transmitted to the DDC/ADC block through the feedback path 625 connected to the RF stage of nTx number of paths. The obtained reference signals may be RF signals. Since the reference signals are looped back for phase alignment between different paths, the reference signals may be processed in the same DDC/ADC block for accurate phase alignment. The DDC/ADC block may output response signals corresponding to the obtained reference signals. The RU 220 may provide the response signals to the DU 210.

The DU 210 may include a phase alignment unit 635. The phase alignment unit 635 may include various circuitry and/or executable program instructions and obtain the response signals. The phase alignment unit 635 may identify phase information in the corresponding path, by comparing the reference signal generated for each path with the obtained response signal. For example, the phase information in path #i may include a phase difference between the reference path (e.g., path #0) and the path #i (e.g., path #i). The phase alignment unit 635 may identify the phase information of each path for phase alignment between paths of the RU 220.

The DU 210 may perform a series of procedures described in FIG. 6 with each of the RUs configured for JT. The DU 210 may identify phase information on paths of a plurality of RUs and may perform the phase alignment based on the phase information. For example, in case that a total of M RUs are configured for the JT technique, the DU 210 may identify a minimum of M−1 to a maximum of 'M×nTx-1' pieces of phase information. The DU 210 may perform the phase alignment for the M RUs based on the phase information. According to an embodiment, the DU 210 may obtain phase information of all paths of the plurality of RUs and may perform the phase alignment based on the obtained phase information. The DU 210 may receive response signals for all paths of the corresponding RU from each RU. The DU 210 may perform phase alignment for the RU 220-*m* based on response signals for all paths of the RU 220-*m*. The phase alignment performed based on phase information of all paths of the RU 220-*m* may be referred to as a first phase alignment technique hereinafter. Operations for the first phase alignment technique are described in greater detail below with reference to FIG. 7A. Also, according to an embodiment, the DU 210 may obtain phase information of a path (hereinafter, a representative path) corresponding to at least some of the paths of the plurality of RUs and may perform the phase alignment based on the obtained phase information. The DU 210 may receive a response signal for the representative path from each RU. The DU 210 may perform the phase alignment for the RU 220-*m* based on the response signal of the representative path rather than all paths of the RU 220-*m*. The phase alignment performed based on the phase information of the representative path of the RU may be referred to as a second phase alignment technique hereinafter. Operations for the second phase alignment technique are described in greater detail below with reference to FIG. 7B.

Figure 7A:
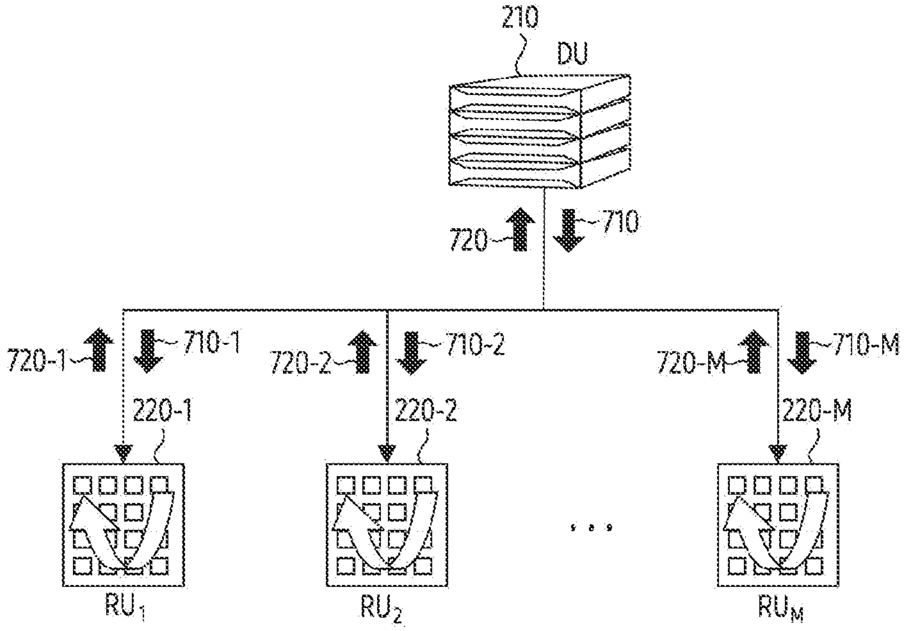
FIG. 7A is a diagram illustrating an example of a first phase alignment technique in a distributed network environment.

FIG. 7A is a diagram illustrating an example of a first phase alignment technique in a distributed network environment (e.g., a distributed network 500). The same reference number may be referred to for the same description between the drawings. The first phase alignment technique may be referred to as a centralized phase alignment technique or a full phase alignment technique.

Referring to FIG. 7A, a centralized DU (e.g., a DU 210) may provide reference signals 710 such that the reference signal is transmitted in each transmission path of all transmission paths of multiple RUs 220-1, 220-2, . . . , 220-M configured for joint transmission (JT). The reference signals may include reference signals 710-1 for the RU 220-1, reference signals 710-2 for the RU 220-2, . . . , reference signals 710-M for the RU 220-M. The reference signals 710-1 for the RU 220-1 may include a reference signal for each of the transmission paths (e.g., nTx number of transmission paths) of the RU 220-1. The reference signals 710-2 for the RU 220-2 may include a reference signal for each of transmission paths (e.g., nTx number of transmission paths) of the RU 220-2. Also, the reference signals 710-M for the RU 220-M may include a reference signal for each of the transmission paths (e.g., nTx number of transmission paths) of the RU 220-M. For example, in case that each RU is equipped with $n_T$ number of transmitters (e.g., $n_T$ number of antennas), the number of reference signals 710 is total $n_T$M.

The RU 220-*m* may receive reference signals from the DU 210. For example, the RU 220-*m* may receive a U-plane message including the reference signals through a fronthaul interface. The RU 220-*m* may transmit the reference signals through antennas. The RU 220-*m* may perform loop-back. The RU 220-*m* may obtain a response signal corresponding to the feedback of the reference signal transmitted through each antenna. The RU 220-*m* may obtain response signals 720-*m* for the reference signals. The RU 220-*m* may transmit the response signals to the DU 210. For example, the RU 220-*m* may transmit the U-plane message including the response signals to the DU 210. Each RU may transmit response signals for the reference signals transmitted from the corresponding RU to the DU 210. For example, the RU 220-1 may transmit response signals 720-1 for transmission paths (e.g., nTx number of transmission paths) to the DU 210. The RU 220-2 may transmit response signals 720-2 for transmission paths (e.g., nTx number of transmission paths) to the DU 210. Also, the RU 220-M may transmit response signals 720-M for transmission paths (e.g., nTx number of transmission paths) to the DU 210. The DU 210 may obtain response signals 710 for transmission paths (e.g., $n_T$M number of transmission paths) of the RUs 220-1, 220-2, . . . , 220-M.

The DU 210 may perform phase alignment based on the response signals 710 for the transmission paths (e.g., $n_T$M number of transmission paths) of the RUs 220-1, 220-2, . . . , 220-M. The DU 210 may generate phase alignment information for each path of each RU. The DU 210 may transmit the phase alignment information to a corresponding RU. The phase alignment information may include a phase compensation value in each transmission path so that phase distortion does not occur, when transmitting data through the transmission paths of the RUs 220-1, 220-2, . . . , 220-M. Based on the phase alignment information, in the transmission paths of the RUs 220-1, 220-2, . . . , 220-M, all phases may be aligned. For example, the DU 210 may generate first phase alignment information for the RU 220-1 and second phase alignment information for the RU 220-2 so that a phase difference between the RU 220-1 and the RU 220-2 becomes zero. The DU 210 may transmit the first phase alignment information to the RU 220-1. The DU 210 may transmit the second phase alignment information to the RU 220-2. Meanwhile, in case that phase alignment of the RU 220-1 is not required (e.g., the phase of the RU 220-1 is a reference phase), the first phase alignment information may not be transmitted to the RU 220-1.

Path Identification

The DU 210 may configure information for identifying each transmission path among all transmission paths. For example, $n_T$ transmission paths may be configured for the JT technique in each RU of the RUs 220-1, 220-2, . . . , 220-M. The DU 210 may configure one or more pieces of identification information for identifying $n_T$M paths. For example, in case that a packet is transmitted through Ethernet such as an O-RAN standard, the one or more pieces of identification information may be included in a packet header, in order to distinguish each path. According to an embodiment, the DU 210 may configure a path ID, in order to transmit a reference signal for each path of the RU. Also, the DU 210 may configure an RU ID, in order to distinguish the RU. The DU 210 may configure the RU ID for indicating the RU and the path IDs for indicating paths within the RU, in order to provide the reference signal to the RU. The DU 210 may include the RU ID and the path IDs in the control message for the RU. According to an embodiment, the DU 210 may configure the path ID for identifying a specific transmission path among all transmission paths, in order to transmit the reference signal for each path. The DU 210 may configure the path ID independently of the RU. The DU 210 may configure the path IDs corresponding to paths of the RU, in order to provide the reference signal to the RU. The DU 210 may include the path IDs in the control message for the RU. The control message may include the RU ID independently of path IDs of transmission paths.

Reference Signal Transmission Method

The RU (e.g., the RU 220-*m*) may transmit the reference signals (e.g., the reference signals 710-*m*) for the phase alignment. In FIG. 7A, the reference signals are directly transmitted from the DU 210 to the RU 220-*m*, but embodiments of the present disclosure are not limited thereto.

According to an embodiment, the DU 210 may transmit at least one parameter for generating the reference signal to the RU 220-*m*. The RU 220-*m* may generate the reference signal based on the at least one parameter. The RU 220-*m* may obtain a response signal corresponding to the reference signal through loopback at the RF end. For example, the at least one parameter may include the RU ID and the path ID. The reference signal may include a sequence generated based on the RU ID and the path ID. For example, the sequence may be scrambled based on the RU ID and the path ID. Also, for example, the at least one parameter may include the path ID. The reference signal may include the sequence generated based on the path ID. For example, the sequence may be scrambled based on the path ID. Also, for example, the at least one parameter may include an eAxC ID. The eAxC ID may include a band and sector identifier ('BandSector_ID'), a component carrier identifier ('CC_ID'), a spatial stream identifier ('RU_Port_ID') and a distributed unit identifier ('DU_Port_ID'). The reference signal may include a sequence generated based on the eAxC ID. For example, the sequence may be scrambled based on the eAxC ID.

According to an embodiment, the DU 210 may transmit index information of the reference signal to the RU 220-*m*. The RU 220-*m* may store reference signal table information. The reference signal table information may include reference signals of the transmission paths of the RUs. A reference signal corresponding to a specific transmission path of a specific RU may be identified through the reference signal table information. The RU 220-*m* may identify the known reference signal table information in the DU 210. For example, reference signals are standardized in advance, and the RU 220-*m* may share reference signal table information with the DU 210. Also, for example, the reference signal table information may be set in advance by an M-plane message of the DU 210. The DU 210 may inform a reference signal that should be transmitted for the phase alignment to the RU 220-*m*, by transmitting index information to the RU 220-*m*. The RU 220-*m* may generate the reference signal based on the index information and may transmit the generated reference signal. Through the index information, the amount of information required for transmission of the reference signal between the DU 210 and the RU 220-*m* may be reduced.

Phase Alignment

The reference signals for the phase alignment may be used to compensate phase distortion over time. The reference signals are not transmitted to another external device (e.g., a terminal 120) on an actual wireless channel, but are signals that must be looped back to compensate the phase distortion. Thus, the DU 210 is required to inform the RU 220-*m* that the reference signals are separate data different from the downlink data.

According to an embodiment, the DU 210 may transmit a section type C-plane message (e.g., Section Type 9) for the phase alignment to the RU 220-*m*. In other words, a new section type for indicating that it is intended for the phase alignment may be defined. The DU 210 may transmit the C-plane message including a section type field indicating the section type for the phase alignment to the RU 220-*m*. For example, the U-plane message coupled to the C-plane message may include the reference signals. Also, for another example, the C-plane message may include the at least one parameter or the index information for generating the reference signals.

According to an embodiment, the DU 210 may transmit section extension information (e.g., Section Extension YY) indicating that the reference signals for the phase alignment are transmitted to the RU 220-*m*. In other words, new section extension information for indicating that it is intended for the phase alignment may be defined. Information (e.g., 'extType' field) indicating the type of the section extension information may indicate that the reference signals associated with the C-plane are used for the phase alignment. The DU 210 may transmit the C-plane message including the section extension information for the phase alignment to the RU 220-*m*. For example, the U-plane message coupled to the C-plane message may include the reference signals. Also, for another example, the C-plane message may include the at least one parameter or the index information for generating the reference signals. According to various example embodiments, the section extension information may include the at least one parameter for generating the reference signals or at least one parameter index information for generating the reference signals.

According to an embodiment, the DU 210 may transmit a separate indicator indicating that the reference signals for the phase alignment are transmitted to the RU 220-*m*. For example, the DU 210 may transmit the U-plane message including IQ samples corresponding to the reference signals to the RU 220-*m*. A field in the U-plane message may include the indicator indicating that the reference signals for the phase alignment are transmitted. The indicator may optionally be present. In other words, the indicator may not always present.

Processing Time

Messages (e.g., the C-plane messages, the U-plane messages, or the M-plane messages) may be transmitted on the fronthaul interface between the DU 210 and the RU 220-*m*. Data transmitted from the DU 210 to the RU 220-*m* or data transmitted from the RU 220-*m* to the DU 210 may all be controlled through the control message (e.g., the C-plane). Since the data corresponds to the IQ samples of the U-plane message, the DU 210 may transmit the C-plane message for scheduling or triggering the U-plane message to the RU 220-*m*. The RU 220-*m* may generate the response signals (e.g., the response signals 720-*m*) for the reference signals (e.g., the reference signals 710-*m*). The RU 220-*m* may generate the U-plane message including the response signals 720-*m*, in order to transmit the response signals 720-*m* to the DU 210. To transmit the U-plane message, the DU 210 may transmit the C-plane message to the RU 220-*m*. The DU 210 may transmit the C-plane message (hereinafter, a reference signal control message) for transmitting the reference signals to the RU 220-*m*, and then may transmit the C-plane message (hereinafter, a response signal control message) for transmitting the response signals to the RU 220-*m*. The processing time for generating the response signals after the RU 220-*m* transmits the reference signals is required to the RU 220. Thus, the DU 210 may schedule the U-plane message for transmitting the response signals based on the processing time. For example, the DU 210 may schedule the U-plane message by adding an extra time to the processing time between a timing when the RU 220-*m* obtains the reference signal and a timing when the RU 220-*m* generates the response signal. The DU 210 may generate the response signal control message based on the scheduling result.

According to an embodiment, in order to ensure the processing time, a designated time interval may be defined in the standard. The designated time may include a value (e.g., a value obtained by adding the extra time) greater than the processing time. For example, an interval between a timing at which the reference signals are transmitted and a timing at which the U-plane message including the response signals is transmitted may be equal to or greater than the designated time interval. Also, according to an embodiment, the processing time may be provided from the RU 220-*m*. In a negotiation procedure for RU capability between the DU 210 and the RU 220-*m*, the DU 210 may obtain information on the processing time for the RU 220-*m*. For example, the RU 220-*m* may transmit the M-plane message including the information on the processing time to the DU 210. Also, for example, the RU 220-*m* may transmit the M-plane message including information on the number of transmitters (or antennas) that may be used for the phase alignment to the DU 210.

The RU 220-*m* may receive the response signal control message from the DU 210. The response signal control message may be used to request the response signal from the RU 220-*m*. The RU 220-*m* may transmit data stored in the response buffer to the DU 210. For example, the RU 220-*m* may transmit the path ID corresponding to data and the U-plane message including the data to the DU 210. Also, for example, the RU 220-*m* may transmit the U-plane message including the indicator for indicating that it is the response signal for the phase alignment, to the DU 210.

Through the above-described example embodiments, parameters for the first phase alignment technique may be illustrated, for example, as shown in the table below.

TABLE 1

| Parameter | Number of information | Explanation |
|---|---|---|
| ru_id | M | RU Identifier |
| path_id | $N_T$ | Path identifier for each RU |
| phase_alignment_path_id | $N_T \cdot M$ | Path identifier in all transmission paths for phase alignment |
| $t_{proc}$ | M | Time until individual RU receives nT reference signals and obtains a response signal |
| $i_{nterval}$ | 1 | Predefined time interval to ensure processing time in RU |
| number-of-tx-phase_alignment | M | The number of transmission paths to be used for phase alignment for each RU |
| reference signal | $N_T \cdot M$ | Reference signal transmitted directly from DU to RU |
| reference signal id | $N_T \cdot M$ | Index information for indicating the reference signal in the reference signal table between DU and RU |
| generation parameters for reference signal | $N_T \cdot M$ | Parameter for generating a reference signal in RU (may vary depending on the type of reference signal) |
| response signal per RU | nT | Response signal transmitted from individual RU to DU |

For example, at least one of the parameters may be provided to the RU through at least one of the M-plane message, the C-plane message, and the U-plane message. Also, for example, the at least one of the parameters may be configured in advance by a standard or preset. The signaling method for the above-described parameters is described in detail with reference to FIGS. 9A to 9C.

Figure 7B:
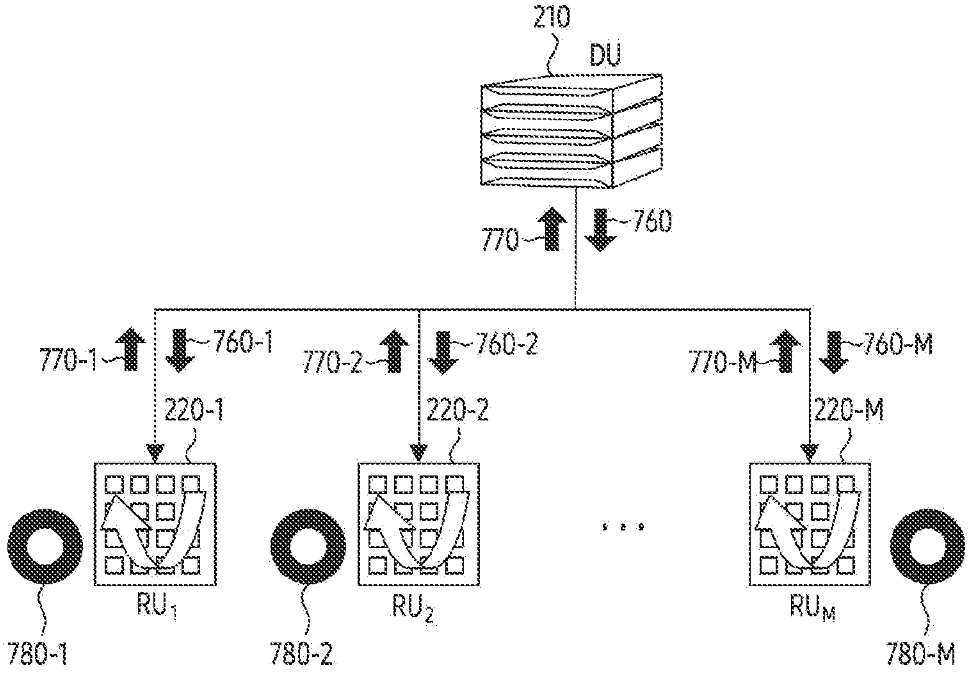
FIG. 7B is a diagram illustrating an example of a second phase alignment technique in a distributed network environment.

FIG. 7B is a diagram illustrating an example of a second phase alignment technique in a distributed network environment (e.g., a distributed network 500). The same reference number may be referred to for the same description between the drawings. In a first phase alignment technique, since a DU 210 collects information on full paths, not only does the amount of computation increase in the DU 210 but also the required fronthaul capacity increases. Also, since reference signals for all paths must be configured in the first phase alignment technique, resource consumption also increases. In order to reduce the limited resource problem and the fronthaul capacity problem, in a second phase alignment technique, the DU 210 may control the RU to transmit the reference signal only for a representative path among paths of the RU and to feedback a response signal. The second phase alignment technique may be referred to as a distributed phase alignment technique or a partial phase alignment technique.

Referring to FIG. 7B, a centralized DU (e.g., the DU 210) may provide reference signals 710 so that the reference signal is transmitted in each transmission path of representative paths of multiple RUs 220-1, 220-2, . . . , 220-M configured for joint transmission (JT). Here, the representative path indicates a transmission path in which reference signal transmission is performed for phase alignment among transmission paths of the RU. The representative path may be configured for each RU. In the present disclosure, an example in which the phase alignment is performed through one representative path is illustrated, but embodiments of the present disclosure are not limited thereto. For example, for the second phase alignment technique, two or more representative paths may be configured in the RU. The reference signals may include a reference signal 760-1 for RU 220-1, a reference signal 760-2 for RU 220-2, . . . , a reference signal 760-M for RU 220-M. The reference signal 760-1 for the RU 220-1 may be transmitted through a representative path of the RU 220-1. The reference signal 760-2 for the RU 220-2 may be transmitted through a representative path of the RU 220-2. The reference signal 760-M for the RU 220-M may be transmitted through a representative path of the RU 220-M. For example, the number of reference signals 760 is total M.

The RU 220-*m* may receive the reference signal 760-*m* for the representative path of the RU 220-*m* from the DU 210. The reference signal may be outputted through the representative path of the RU 220-*m*. For example, the RU 220-*m* may receive a U-plane message including the reference signal through a fronthaul interface. The RU 220-*m* may obtain a response signal 770-*m* for the reference signal. The RU 220-*m* may transmit the response signal 770-*m* to the DU 210. For example, the RU 220-*m* may transmit the U-plane message including the response signal 770-*m* to the DU 210. Each RU may transmit a response signal for a reference signal transmitted in a representative path of the corresponding RU, to the DU 210. For example, the RU 220-1 may transmit a response signal 770-1 for the representative path, to the DU 210. The RU 220-2 may transmit a response signal 770-2 for the representative path, to the DU 210. Also, the RU 220-M may transmit the response signal 770-M for the representative path, to the DU 210. The DU 210 may obtain response signals 770 for representative paths (e.g., M number of transmission paths) of the RUs 220-1, 220-2, . . . , 220-M.

The DU 210 may perform the phase alignment based on the response signals 770 for the representative paths (e.g., M number of transmission paths) of the RUs 220-1, 220-2, . . . , 220-M. The DU 210 may generate phase alignment information for each representative path of each RU. The DU 210 may transmit the phase alignment information to the corresponding RU. The phase alignment information may include a phase compensation value in each representative path so that a phase distortion does not occur, when transmitting data through the transmission paths of the RUs 220-1, 220-2, . . . , 220-M. Based on the phase alignment information, in the representative paths of the RUs 220-1, 220-2, . . . , 220-M, phases may all be aligned.

Unlike the first phase alignment technique, in the second phase alignment technique, in order to reduce the fronthaul capacity and consumption resource required for the phase alignment, the DU 210 may perform the phase alignment for the representative paths of the RUs, not all transmission paths of the RUs. The phase alignment between the representative path of the RU and a general path(s) (i.e., a path that is not the representative path) of the RU among the transmission paths of the RU may be performed inside the RU. The RU 220-*m* may receive the phase alignment information for the representative path from the DU 210. The RU 220-*m* may adjust a phase offset to the representative path based on the phase alignment information. The RU 220-*m* may perform internal phase alignment 780-*m* for other transmission paths except for the representative path. For example, the RU 220-*m* may perform the internal phase alignment 780-*m* by transmitting a test signal through transmission paths which are not the representative path of the RU 220-*m* and checking the phase change of the test signal. For example, the RU 220-1 may perform internal phase alignment 780-1. The RU 220-2 may perform internal phase alignment 780-2. Also, the RU 220-M may perform the internal phase alignment 780-M.

The parameters described in the first phase alignment technique of FIG. 7A may be configured in the same manner as in FIG. 7B. Even in the second phase alignment technique, the DU 210 may configure information for identifying the representative path among all transmission paths. For example, one representative path may be configured for the JT technique in each RU of the RUs 220-1, 220-2, . . . , 220-M. The DU 210 may configure one or more pieces of identification information for identifying M number of representative paths. According to an embodiment, the DU 210 may configure a path ID, in order to transmit the reference signal to the representative path of the RU. Also, the DU 210 may configure an RU ID, in order to distinguish the RU. In order to provide the reference signal to the RU, the DU 210 may configure the RU ID for indicating the RU and the path ID for indicating the representative path within the RU. According to an embodiment, the DU 210 may configure the path ID for identifying the representative path among all transmission paths, in order to transmit the reference signal for each path. The DU 210 may configure the path ID independently of the RU. The DU 210 may include the path ID in a control message for the RU. The control message may include the RU ID independently of identification of the representative path.

The RU (e.g., the RU 220-*m*) may transmit the reference signal (e.g., the reference signal 760-*m*) for the phase alignment. Although, in FIG. 7B, it has been described that the reference signal 760-*m* is directly transmitted from the DU 210 to the RU 220-*m*, the embodiments of the present disclosure are not limited thereto. According to an embodiment, the DU 210 may transmit at least one parameter for generating the reference signal 760-*m* to the RU 220-*m*. The RU 220-*m* may generate the reference signal 760-*m* based on the at least one parameter. For example, the at least one parameter may include the RU ID and the path ID. Also, for example, the at least one parameter may include the path ID. Also, for example, the at least one parameter may include an eAxC ID. The eAxC ID may include a band and sector identifier ('BandSector_ID'), a component carrier identifier ('CC_ID'), a spatial stream identifier ('RU_Port_ID') and a distributed unit identifier ('DU_Port_ID'). Also, according to an embodiment, the DU 210 may transmit index information of the reference signal to the RU 220-*m*. The RU 220-*m* may store reference signal table information. For example, reference signals are standardized in advance, and the RU 220-*m* may share reference signal table information with the DU 210. Also, for example, the reference signal table information may be set in advance by an M-plane message of the DU 210. The DU 210 may inform the reference signal 760-*m* that should be transmitted for the phase alignment to the RU 220-*m*, by transmitting index information to the RU 220-*m*. The RU 220-*m* may generate the reference signal 760-*m* based on the index information and may transmit the generated reference signal 760-*m*.

Like the first phase alignment technique, even in the second phase alignment technique, the DU 210 is required to inform the RU 220-*m* that the reference signal 760-*m* is separate data different from downlink data. According to an embodiment, the DU 210 may transmit a section type C-plane message (e.g., Section Type 9) for the phase alignment to the RU 220-*m*. Also, according to an embodiment, the DU 210 may transmit section extension information (e.g., Section Extension YY) indicating that the reference signal 760-*m* for the phase alignment is transmitted to the RU 220-*m*. Also, according to an embodiment, the DU 210 may transmit a separate indicator indicating that the reference signal 760-*m* for the phase alignment is transmitted to the RU 220-*m*. For example, the DU 210 may transmit the U-plane message including IQ samples corresponding to the reference signal 760-*m* to the RU 220-*m*.

Messages (e.g., the C-plane messages, the U-plane messages, or the M-plane messages) may be transmitted on the fronthaul interface between the DU 210 and the RU 220-*m*. Data transmitted from the DU 210 to the RU 220-*m* or data transmitted from the RU 220-*m* to the DU 210 may all be controlled through the control message (e.g., the C-plane). Since the data corresponds to the IQ samples of the U-plane message, the DU 210 may transmit the C-plane message for scheduling or triggering the U-plane message to the RU 220-*m*. The RU 220-*m* may generate the response signal 770-*m* for the reference signal 760-*m* of the representative path. The RU 220-*m* may generate the U-plane message including the response signal 770-*m*, in order to transmit the response signal 770-*m* to the DU 210. To transmit the U-plane message, the DU 210 may transmit the C-plane message to the RU 220-*m*. According to an embodiment, in order to ensure the processing time, a designated time interval may be defined in the standard. Also, according to an embodiment, the processing time may be provided from the RU 220-*m*.

The RU 220-*m* may receive the response signal control message from the DU 210. The response signal control message may be used to request the response signal from the RU 220-*m*. The RU 220-*m* may transmit data stored in the response buffer to the DU 210. For example, the RU 220-*m* may transmit the path ID of the representative path and the U-plane message including the data, to the DU 210.

Through the above-described embodiments, parameters for the second phase alignment technique may be illustrated by way of example as shown in the table below.

TABLE 2

| Parameter | Number of information | Explanation |
|---|---|---|
| ru_id | M | RU Identifier |
| path_id | 1(Minimum) | Path identifier for each RU |
| phase_alignment_path_id | M(Minimum) | Path identifier in all transmission paths for phase alignment |
| $t_{proc}$ | M | Time until individual RU receives nT reference signals and obtains a response signal |
| $t_{interval}$ | 1 | Predefined time interval to ensure processing time in RU |
| number-of-tx-phase_alignment | 1(Minimum) | Number of representative path(s) to be used for phase alignment for each RU |
| reference signal | M(Minimum) | Reference signal transmitted directly from DU to RU |
| reference signal id | M(Minimum) | Index information for indicating reference signal in reference signal table between DU and RU |
| generation parameters for reference signal | M(Minimum) | Parameter for generating reference signal in RU (may vary depending on the type of reference signal) |
| response signal per RU | 1(Minimum) | Response signal transmitted from individual RU to DU |

For example, at least one of the parameters may be provided to the RU through at least one of the M-plane message, the C-plane message, and the U-plane message. Also, for example, the at least one of the parameters may be configured in advance by a standard or preset. The signaling method for the above-described parameters is described in detail with reference to FIGS. 9A to 9C.

Change of Representative Path

Unlike the first phase alignment technique, the second phase alignment technique is required to select the representative path of the RU. However, if the representative path is fixed for the phase alignment of the RU, phases of all transmission paths of the corresponding RU may not be aligned for phases of transmission paths of other RUs due to the representative path having poor phase characteristics. In order to address the above-described problem, the representative path of the RU may be changed.

According to an embodiment, the DU 210 may change the representative path. For example, the DU 210 may change the representative path based on a designated algorithm (e.g., rotation). For example, the DU 210 may change the representative path whenever one phase alignment is completed (e.g., the phase alignment information is provided to the RUs). For another example, the DU 210 may change the representative path whenever the designated time arrives. Also, for example, the DU 210 may change the representative path based on the amount of phase change. For example, in case that the amount of phase change in the third path, which is the current representative path of the RU 220-*m*, is greater than the threshold, the DU 210 may determine the third path of the RU 220-*m* as an abnormal path and may change the representative path of the RU 220-*m* from the third path to the fourth path. Also, for example, the DU 210 may change the representative path based on detecting a failure of the current representative path of the RU 220-*m*.

According to an embodiment, the RU 220-*m* may change the representative path. For example, the RU 220-*m* may change the representative path based on the designated algorithm (e.g., rotation). For example, the RU 220-*m* may change the representative path whenever one phase alignment is completed (e.g., the phase alignment information is received from the DU). For another example, the RU 220-*m* may change the representative path whenever the designated time arrives. Also, for example, the RU 220-*m* may change the representative path based on the amount of phase change. For example, the RU 220-*m* may determine the fourth path of the RU 220-*m* as an abnormal path, in case that the amount of the phase change in the fourth path, which is the current representative path of the RU 220-*m*, is greater than the threshold. The RU 220-*m* may change the representative path from the fourth path to the fifth path. Also, for example, based on detecting the failure of the current representative path of the RU 220-*m*, the representative path may be changed.

Figure 8:
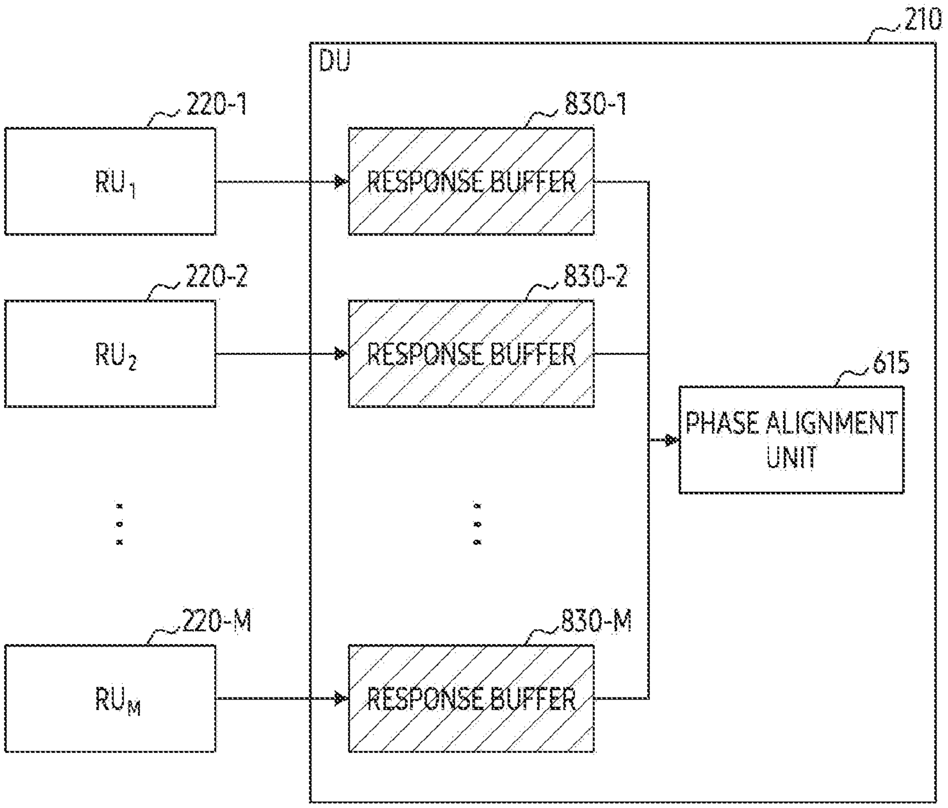
FIG. 8 is a block diagram illustrating an example of a buffer memory for phase alignment.

FIG. 8 is a block diagram illustrating an example of a buffer memory for phase alignment. The same reference number may be referred to for the same description between the drawings. Under the control of a DU (e.g., a DU 210), a RU (e.g., a RU 220-*m*) may transmit a reference signal for each path or may transmit a reference signal for a representative path. The RU 220-*m* may obtain a response signal outputted after the reference signal passes through a transmission path. The RU 220-*m* may transmit the response signal to the DU 210. A phase difference between the response signal and the reference signal may be used for the phase alignment for a plurality of RUs 220-1, 220-2, . . . , 220-M for joint transmission.

Referring to FIG. 8, the DU 210 may perform the phase alignment for all of the plurality of RUs 220-1, 220-2, . . . , 220-M. The phase alignment may be performed sequentially for each RU according to the capacity of the DU 210 or may be performed simultaneously for the RUs. Since the DU 210 needs to perform the phase alignment for all of the plurality of RUs 220-1, 220-2, . . . , 220-M, it may store response signals received from each RU in memory. The internal memory may be referred to as a response buffer. The DU 210 may include the response buffer for each RU. For example, the DU 210 may include a response buffer 830-1 for the RU 220-1. The DU 210 may include a response buffer 830-2 for the RU 220-2. Also, the DU 210 may include a response buffer 830-M for the RU 220-M. In an Ethernet environment such as the O-RAN standard, it is difficult to accurately predict the reception signal timing of a transmitted packet. Thus, in order to distinguish the response signal from the buffer, identification information for the response signal may be required. For example, in order to store the response signal in the response buffer 830-*m*, identification information for identifying the RU and transmission paths for each RU may be required. According to an embodiment, the identification information (e.g., packet ID) for the response signal may be included in a packet header of the response signal.

According to an embodiment, in the first phase alignment technique (i.e., full phase alignment technique), the DU 210 may include the response buffer for each RU. Here, the response buffer 830-*m* for the RU 220-*m* may be required to accommodate response signals for all transmission paths of the RU 220-*m*. For example, in case that the number of transmission paths of the RU 220-*m* is $n_T$, the response buffer 830-*m* for the RU 220-*m* may include $n_T$ number of response buffers. Also, according to an embodiment, in the second phase alignment technique (i.e., partial phase alignment technique), the DU 210 may include the response buffer for each RU. Here, the response buffer 830-*m* for the RU 220-*m* may be required to accommodate the response signal for the representative path of the RU 220-*m*. The response buffer 830-*m* for the RU 220-*m* may include as many response buffers as the number (e.g., one) of representative paths.

Figure 9A:
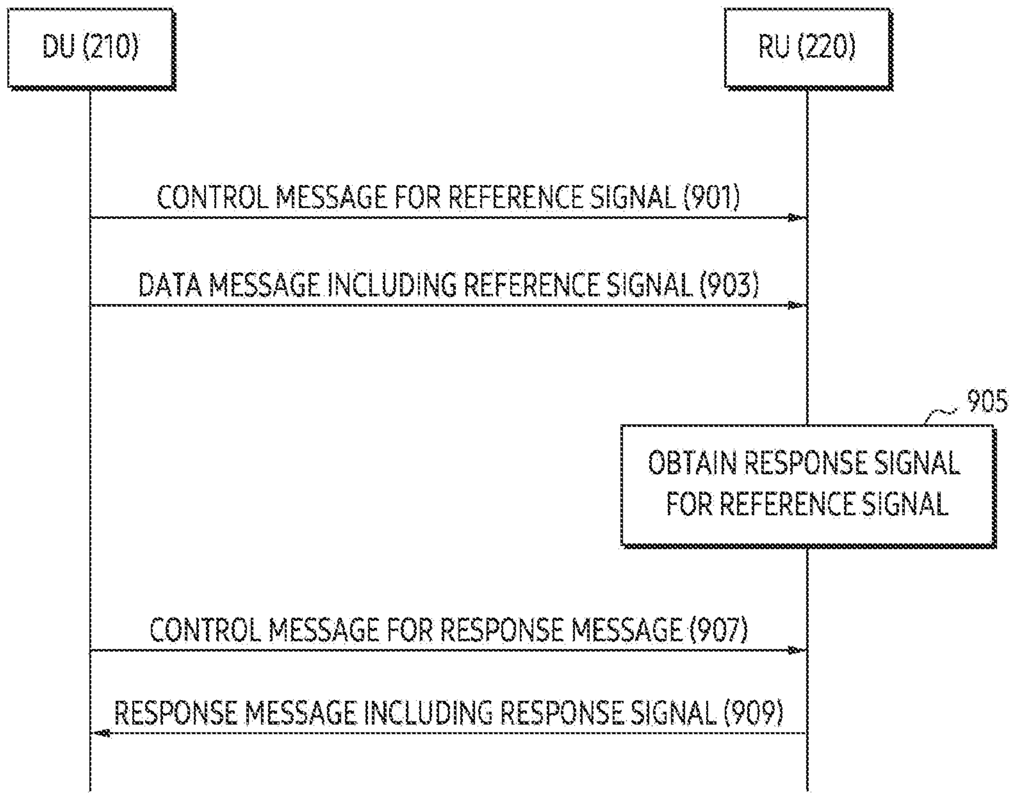
FIGS. 9A, 9B and 9C are signal flow diagrams illustrating examples of reference signal transmission and response signal transmission for phase alignment.
Figure 9B:
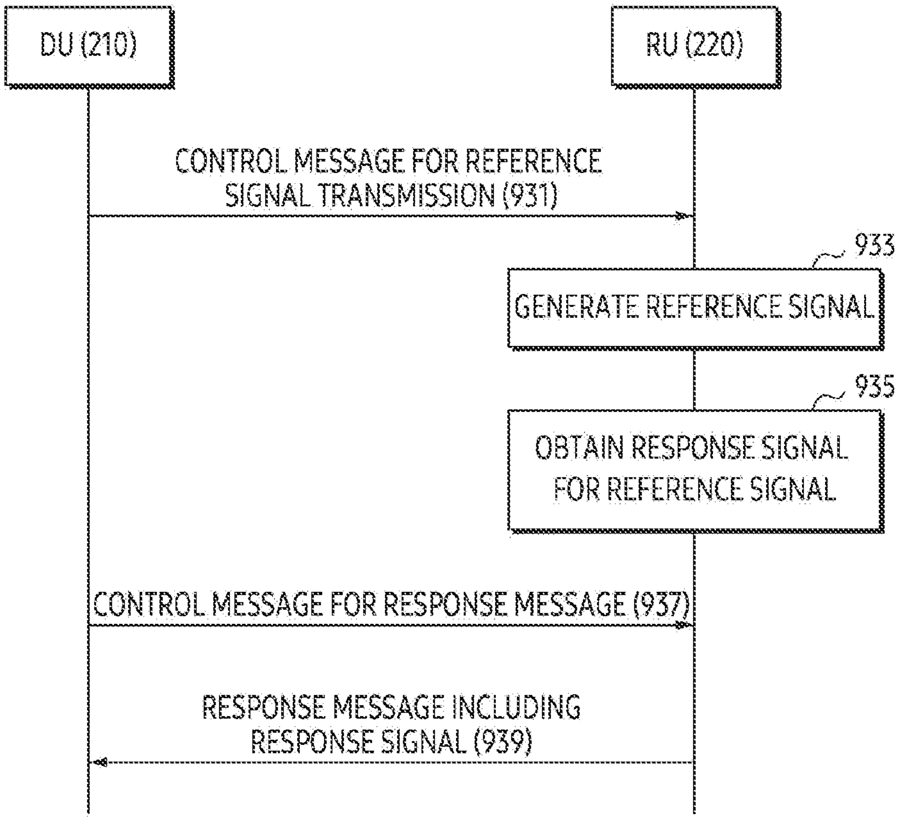
Figure 9C:
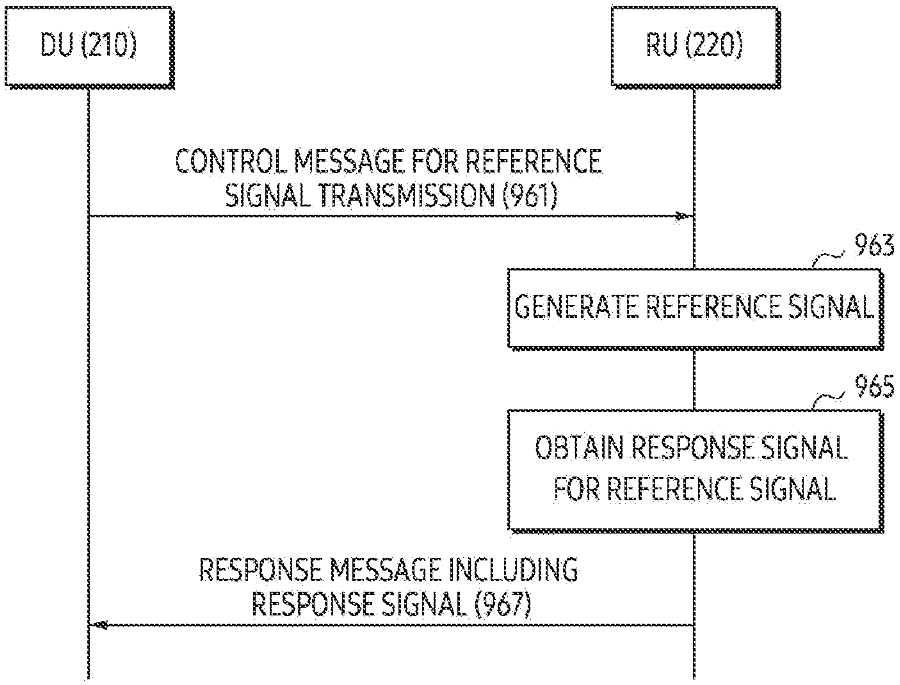

FIGS. 9A, 9B and 9C are signal flow diagrams illustrating examples of reference signal transmission and response signal transmission for phase alignment. The same reference number may be referred to for the same description between the drawings. Hereinafter, an RU (e.g., an RU 220) is an example of one of a plurality of RUs connected to a DU (e.g., a DU 210) and configured for joint transmission (JT).

Referring to FIG. 9A, in operation 901, the DU 210 may transmit a control message for the reference signal to the RU 220. For example, the control message may be a C-plane message of the O-RAN standard. The C-plane message may be used to schedule a U-plane message including the reference signal. For example, the C-plane message may include section information for the U-plane message. According to an embodiment, the C-plane message may include indication information for notifying that the reference signal for the phase alignment is transmitted. For example, the indication information may be indicated by the section type of the C-plane message. Also, for example, the indication information may be indicated by a section extension field of the C-plane message. Also, according to an embodiment, the control message may include an RU ID and a path ID, in order to indicate the transmission path associated with the reference signal.

In operation 903, the DU 210 may transmit a data message including the reference signal to the RU 220. For example, the C-plane message may be the U-plane message of the O-RAN standard. The DU 210 may transmit the data message to the RU 220 based on the C-plane message. The data message may include IQ sample data for the reference signals to be transmitted from the RU 220.

At operation 905, the RU 220 may obtain a response signal for the reference signal. The RU 220 may obtain the reference signal from the data message. For example, in the first phase alignment technique, the RU 220 may obtain the reference signals for the paths of the RU 220 from the data message. Since the phase to be changed may vary as the transmission path is different, the reference signal may be configured for each transmission path. Also, for example, in the second phase alignment technique, the RU 220 may obtain a reference signal for a representative path of the RU 220 from the data message.

The RU 220 may transmit the reference signal. The RU 220 may transmit the reference signal to an RF end through the transmission path. The phase of the inputted reference signal may vary by hardware components of the transmission path of the RU 220. The response signal may be outputted from the transmission path according to the input of the reference signal. In order to identify the phase that vary due to the components (e.g., DAC, DUC, switch, RF transmitter) of the transmission path, in other words, the phase difference, the RU 220 may obtain the response signal through a feedback path connected from the antenna end. The RU 220 may store the response signal. The RU 220 may store the response signal in the response buffer. For example, in the first phase alignment technique, the RU 220 may store the response signal for each transmission path. Since the changed phase may vary as the transmission path is different, the RU 220 may transmit the reference signal for each path. The RU 220 may store the response signal for each path. Also, for example, in the second phase alignment technique, the RU 220 may store the response signal for the representative path of the RU 220.

In operation 907, the DU 210 may transmit the control message for the response signal to the RU 220. For example, the control message may be the C-plane message of the O-RAN standard. The C-plane message may be used to schedule the U-plane message including the response signal. For example, the C-plane message may include the section information for the U-plane message. The C-plane message may trigger the RU 220 to report the U-plane message including the response signal. According to an embodiment, the C-plane message may include information for triggering response signal transmission of the RU 220. For example, the information may be indicated by the section type of the C-plane message. Also, for example, the information may be indicated by the section extension field of the C-plane message.

In operation 909, the RU 220 may transmit the response message including the response signal to the DU 210. For example, the response message may be the U-plane message of the O-RAN standard. The RU 220 may transmit the response message to the DU 210 based on the control message of the operation 907. The response message may include data of the response buffer of the RU 220. The data of the response buffer may include the IQ sample data for the response signal. For example, in the first phase alignment technique, the RU 220 may transmit the response message including response signals for all transmission paths of the RU 220 to the DU 210. Also, for example, in the second phase alignment technique, the RU 220 may transmit the response message including the response signal for the representative path of the RU 220 to the DU 210.

In FIG. 9A, an example of scheduling the U-plane message through the C-plane message and directly transmitting original data of reference signals to be transmitted in the RU 220 through the U-plane message for reference signal transmission has been described, but embodiments of the present disclosure are not limited thereto. According to an embodiment, after generating the reference signals directly in the DU 210, instead of providing the reference signals to the RU 220, the DU 210 may provide limited information for generating the reference signal to the RU 220. The RU 220 may generate the reference signal based on the limited information and may transmit the generated reference signal. Hereinafter, an example of generating the reference signal in the RU 220 will be described in greater detail with reference to FIG. 9B.

Referring to FIG. 9B, in operation 931, the DU 210 may transmit the control message for the reference signal to the RU 220. For example, the control message may be the C-plane message of the O-RAN standard.

According to an embodiment, the C-plane message may include at least one parameter for generating the reference signal. For example, the at least one parameter may include the RU ID and the path ID. Also, for example, the at least one parameter may include the path ID. Also, for example, the at least one parameter may include an eAxC ID. The eAxC ID may include a band and sector identifier ('BandSector_ID'), a component carrier identifier ('CC_ID'), a spatial stream identifier ('RU_Port_ID') and a distributed unit identifier ('DU_Port_ID'). The at least one parameter may be included in the C-plane message in various ways. For example, the at least one parameter may be included in a section header in the C-plane message. Also, for example, the at least one parameter may be indicated by a field of section extension information of the C-plane message.

According to an embodiment, the C-plane message may include index information (or reference signal ID) of the reference signal. For example, the reference signals may be standardized in advance, and the RU 220-*m* may share reference signal table information with the DU 210 in advance. Also, for example, the reference signal table information may be set in advance by an M-plane message of the DU 210. The index information may be included in the C-plane message in various ways. For example, the index information may be included in the section header in the C-plane message. For phase alignment for the joint transmission, a new section type of the C-plane message may be defined. Also, for example, the index information may be indicated by the field of the section extension information of the C-plane message. For the phase alignment for the joint transmission, a new section extension type may be defined.

According to an embodiment, as in the operation 901, the C-plane message may include the indication information for notifying that the reference signal for the phase alignment is transmitted. For example, the indication information may be indicated by the section type of the C-plane message. Also, for example, the indication information may be indicated by a field indicating the section extension type of the C-plane message.

In operation 933, the RU 220 may generate the reference signal. According to an embodiment, the RU 220 may generate the reference signal based on at least one parameter of the C-plane message. For example, the RU 220 may generate the reference signal through scrambling of a designated sequence (e.g., a Zadoff (ZC) sequence, an m-sequence, or a pseudo-random sequence) based on the RU ID and the path ID. For another example, the RU 220 may generate the reference signal according to a designated method based on the eAxC ID. Also, according to an embodiment, the RU 220 may generate the reference signal based on the index information of the C-plane message. For example, the RU 220 may identify a sequence of the reference signal corresponding to the index information based on a stored table. The RU 220 may generate the sequence.

In operation 935, the RU 220 may obtain the response signal for the reference signal. For the operation 935, a description of the operation 905 of FIG. 9A may be referenced.

In operation 937, the DU 210 may transmit the control message for the response signal to the RU 220. For the operation 937, a description of the operation 907 of FIG. 9A may be referenced.

In operation 939, the RU 220 may transmit the response message including the response signal to the DU 210. For the operation 939, a description of the operation 909 of FIG. 9A may be referenced.

Although transmission of the C-plane message for generating the reference signal and transmission of the C-plane message for triggering the response message are described in FIG. 9B, embodiments of the present disclosure are not limited thereto. According to an embodiment, one C-plane message instead of two-C-plane messages may be configured for the phase alignment for the joint transmission of the present disclosure. Hereinafter, an example of the C-plane message for generating the reference signal and requesting the response message will be described in greater detail with reference to FIG. 9C.

Referring to FIG. 9C, in operation 961, the DU 210 may transmit the control message for the reference signal to the RU 220. For example, the control message may be the C-plane message of the O-RAN standard. According to an embodiment, the C-plane message may include the at least one parameter for generating the reference signal. For example, the at least one parameter may include the RU ID and the path ID. Also, for example, the at least one parameter may include the path ID. Also, for example, the at least one parameter may include the eAxC ID. Also, according to an embodiment, the C-plane message may include the index information (or the reference signal ID) of the reference signal. For the operation 961, a description of the operation 931 of FIG. 9B may be referenced.

According to an embodiment, the C-plane message may be used to schedule the U-plane message including the response signal. For example, the C-plane message may include the section information for the U-plane message. The C-plane message may trigger the RU 220 to report the U-plane message including the response signal. According to an embodiment, the C-plane message may include information for triggering the response signal transmission of the RU 220. For example, the information may be included in the section header of the C-plane message. For the phase alignment for the joint transmission, the new section type of the C-plane message may be defined. Also, for example, the information may be indicated by the section extension field of the C-plane message. For the phase alignment for the joint transmission, the new section extension type may be defined.

In order to transmit information for generating the reference signal and trigger the response message, the C-plane message may be configured in various combinations. For example, the C-plane message may have a new section type message format including at least one parameter for generating the reference signal. The section extension information added to the C-plane message may include information for triggering the response message including the response signal for the reference signal configured through the C-plane message. For another example, the C-plane message may have the new section type message format for triggering the response message including the response signal. The section extension information added to the C-plane message may include at least one parameter for generating the C-plane reference signal.

In operation 963, the RU 220 may generate the reference signal. For operation 963, a description of the operation 933 of FIG. 9B may be referenced.

In operation 965, the RU 220 may obtain the response signal for the reference signal. For operation 935, a description of the operation 905 of FIG. 9A may be referenced.

In operation 967, the RU 220 may transmit the response message including the response signal to the DU 210. For example, the response message may be the U-plane message of the O-RAN standard. The RU 220 may transmit the response message to the DU 210 based on the control message of the operation 961. The response message may include data of the response buffer of the RU 220. For operation 967, a description of the operation 909 of FIG. 9A may be referenced.

Figure 10A:
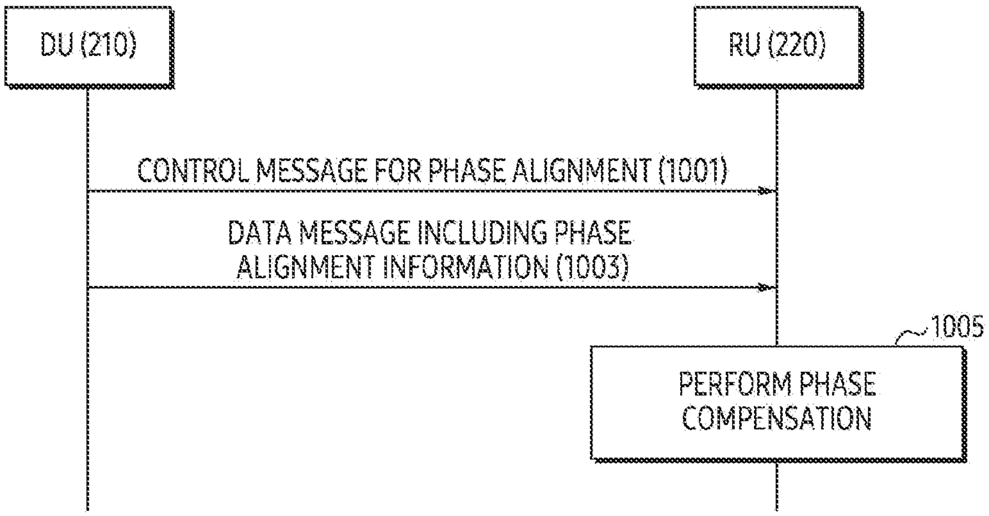
FIGS. 10A and 10B are signal flow diagrams illustrating examples of a phase alignment procedure.
Figure 10B:
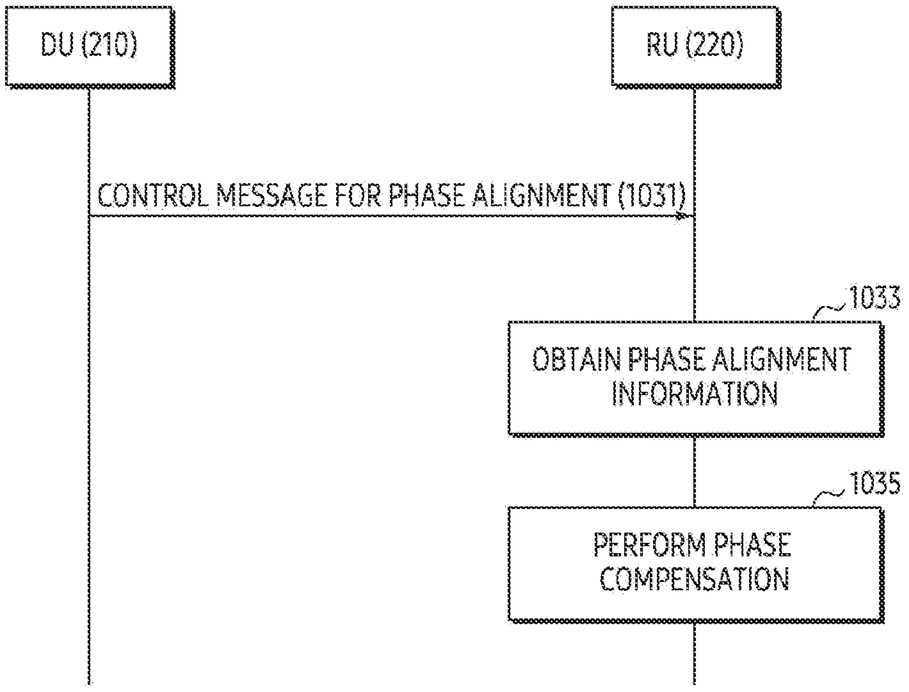

FIGS. 10A and 10B are signal flow diagrams illustrating examples of a phase alignment procedure. The phase alignment procedure may be performed after a series of procedures described in FIGS. 9A to 9C. For example, when a DU 210 obtains all response signals for transmission paths of RUs 220-1, 220-2, . . . , 220-M, the DU 210 may perform the phase alignment based on the received response signals. The DU 210 may generate phase alignment information to be provided to a RU 220 based on a result of the phase alignment.

Referring to FIG. 10A, in operation 1001, the DU 210 may transmit a control message for the phase alignment to the RU 220. For example, the control message may be a C-plane message of an O-RAN standard. The C-plane message may be used to schedule a U-plane message including the phase alignment information. For example, the C-plane message may include section information for the U-plane message.

In operation 1003, the DU 210 may transmit a data message including the phase alignment information to the RU 220. The data message may be the U-plane message of the O-RAN standard. The RU 220 may transmit the data message to the DU 210 based on the control message of the operation 1001. The U-plane message may include the phase alignment information for the RU 220. According to an embodiment, the DU 210 may generate the phase alignment information for the transmission path based on a phase difference between a reference signal in the transmission path and a response signal in the transmission path in the RU 220. For example, in a first phase alignment technique, the DU 210 may generate the phase alignment information for each transmission path of transmission paths of the RU 220. Also, for example, in a second phase alignment technique, the DU 210 may generate the phase alignment information for a representative path of the RU 220. The generated phase alignment information may be included in the U-plane message in the form of IQ sample data.

At operation 1005, the RU 220 may perform phase compensation. The RU 220 may perform the phase compensation based on the phase alignment information. The RU 220 may adjust a phase offset based on the phase alignment information. For example, in the first phase alignment technique, the phase alignment information may include phase difference values for all transmission paths of the RU 220. The RU 220 may apply the phase offset according to the phase difference value to each transmission path of all transmission paths. Also, for example, in the second phase alignment technique, the phase alignment information may include the phase difference value for the representative path of the RU 220. The RU 220 may apply the phase offset according to the phase difference value to the representative path. Thereafter, the RU 220 may perform the phase alignment for a general path (e.g., another path except for the representative path among the transmission paths of the RU 220). For example, the RU 220 may perform the phase alignment for the general path based on the phase difference for the representative path (e.g., the phase difference between the representative path and the general path).

Although not illustrated in FIG. 10A, the RU 220 may process IQ sample data for downlink transmission based on the adjusted phase offset.

Although an example in which the C-plane message and the U-plane message are transmitted together for the phase alignment has been described in FIG. 10A, embodiments of the present disclosure are not limited thereto. The phase alignment information for adjusting the phase offset of the RU 220 may be transmitted through the C-plane message. Hereinafter, an example of the C-plane message including the phase alignment information will be described in greater detail with reference to FIG. 10B.

Referring to FIG. 10B, in operation 1031, the DU 210 may transmit the control message for the phase alignment to the RU 220. For example, the control message may be the C-plane message of the O-RAN standard. According to an embodiment, the C-plane message may include the phase alignment information. For example, in the first phase alignment technique, the C-plane message may include the phase alignment information for each transmission path of the transmission paths of the RU 220. Also, for example, in the second phase alignment technique, the C-plane message may include the phase alignment information for the representative path of the RU 220. The phase alignment information may be included in the C-plane message in various ways. For example, the phase alignment information may be included in a section header in the C-plane message. For phase alignment for joint transmission, a new section type of the C-plane message may be defined. Also, for example, the phase alignment information may be indicated by a field of section extension information of the C-plane message. For the phase alignment for the joint transmission, a new section extension type may be defined.

In operation 1033, the RU 220 may obtain the phase alignment information. The RU 220 may obtain the phase alignment information based on the control message of the operation 1031. For example, the RU 220 may obtain the phase alignment information for each transmission path of all transmission paths of the RU 220. For another example, the RU 220 may obtain the phase alignment information on the representative path of the RU 220.

In operation 1035, the RU 220 may perform the phase compensation. For the operation 1035, a description of the operation 1005 of FIG. 10A may be referenced.

Although not illustrated in FIG. 10B, the RU 220 may process the IQ sample data for the downlink transmission based on the adjusted phase offset.

According to various example embodiments, the C-plane message including the phase alignment information may be used for scheduling the U-plane message. The U-plane message may include downlink data to be transmitted from the RU 220 to a UE (e.g., a terminal 120). In other words, when transmitting the downlink data to the UE through the RU 220, the DU 210 may provide the phase alignment information to the RU 220 through the C-plane message for the downlink data.

In the present disclosure, a technique for achieving a target channel capacity through phase alignment between RUs used for joint transmission has been described. Here, the target channel capacity may include channel capacity when phases are all aligned without phase mismatch on hardware between the RUs of Equation 3. Hardware components may change the phase of the RF signal because the hardware components are sensitive to frequency. In case that data is transmitted through a plurality of RUs, since each RU includes independent hardware, the amount of phase change may vary for each RU. Thus, the DU according to the embodiments of the present disclosure may perform the phase alignment by transmitting a reference signal through a transmission path and controlling each RU to report a response signal corresponding to the reference signal. Messages (e.g., C-plane messages, U-plane messages, and M-plane messages) on a fronthaul may be defined for transmission of the reference signal and reporting of the response signal. Through phase alignment for the RUs, as phase difference between the RUs decreases, channel capacity for a UE may increase.

The effect obtained in the present disclosure are not limited to the above-mentioned effects, and other effects not mentioned will be clearly understood by those having ordinary knowledge in the technical field to which the present disclosure belongs from the following description.

According to various example embodiments, a method performed by a digital unit (DU) is provided. The method may comprise providing a radio unit (RU) with one or more reference signals for phase alignment. The one or more reference signals may be associated with one or more transmission paths of the RU. The method may comprise transmitting, to the RU, a response signal control message for a response message. The method may comprise receiving, from the RU, the response message. The response message may include, for each transmission path of the one or more transmission paths of the RU, a path identifier (ID) and a response signal for a reference signal corresponding to the path ID.

In an example, the providing the RU with the one or more reference signals may comprise transmitting, to the RU, a reference signal control message. The providing the RU with the one or more reference signals may comprise transmitting, to the RU, a data message including the one or more reference signals based on the reference signal control message. The reference signal control message may include an ID of the RU, an ID of each transmission path of the one or more transmission paths, and information for notifying that the one or more reference signals for phase alignment are provided.

In an example, the providing the RU with the one or more reference signals may comprise transmitting, to the RU, a reference signal control message. The reference signal control message may include an ID of the RU, an ID of each transmission path of the one or more transmission paths, and information for notifying that the one or more reference signals for the phase alignment are provided. The reference signal control message may include at least one of at least one parameter for generating the one or more reference signals or index information for indicating the one or more reference signals.

In an example, the method may comprise generating phase alignment information for the RU based on the response message. The method may comprise transmitting, to the RU, a message including the phase alignment information. The phase alignment information may include a phase compensation value determined based on a phase difference between the reference signal and the response signal. The RU may be one of a plurality of RUs configured for joint transmission.

In an example, the response signal may be associated with the reference signal and a signal outputted based on a transmission path corresponding to the path ID.

In an example, the method may comprise changing a representative path of the RU from a first path to a second path. The method may comprise transmitting, to the RU, a control message including a path ID for indicating the second path.

In an example, the representative path of the RU may be changed in case that a phase change of the first path being greater than a threshold is detected, in case that a designated period elapses after representative path of the RU is set as the first path, or in case that phase alignment information generated based on the response message is transmitted to the RU.

According to various example embodiments, a method performed by a radio unit (RU) is provided. The method may comprise obtaining one or more reference signals for phase alignment from a digital unit (DU). The one or more reference signals may be associated with one or more transmission paths of the RU. The method may comprise receiving, from the DU, a response signal control message for a response message. The method may comprise transmitting, to the DU, the response message. The response message may include, for each transmission path of the one or more transmission paths of the RU, a path identifier (ID) and a response signal for a reference signal corresponding to the path ID.

In an example, the obtaining of the one or more reference signals for phase alignment may comprise receiving, from the DU, a reference signal control message. The obtaining of the one or more reference signals for phase alignment may comprise receiving, from the DU, a data message including the one or more reference signals based on the reference signal control message. The reference signal control message may include an ID of the RU, an ID of each transmission path of the one or more transmission paths, and information for notifying that the one or more reference signals for the phase alignment are provided.

In an example, the obtaining of the one or more reference signals for phase alignment may comprise receiving, from the DU, a reference signal control message. The reference signal control message may include an ID of the RU, an ID of each transmission path of the one or more transmission paths, and information for notifying that the one or more reference signals for phase alignment are provided. The reference signal control message may include at least one of at least one parameter for generating the one or more reference signals or index information for indicating the one or more reference signals.

In an example, the method may comprise receiving, from the DU, a message including phase alignment information. The phase alignment information may include a phase compensation value determined based on a phase difference between the reference signal and the response signal. The RU may be one of a plurality of RUs configured for joint transmission.

In an example, the response signal is associated with the reference signal and a signal outputted based on a transmission path corresponding to the path ID.

In an example, the method may comprise changing a representative path of the RU from a first path to a second path. The method may comprise allocating a path ID for indicating the first path within the RU to the second path.

In an example, the method may comprise changing a representative path of the RU from a first path to a second path. The method may comprise transmitting, to the DU, an indication message including a path ID for indicating the second path. The representative path of the RU may be changed in case that a phase change of the first path being greater than a threshold is detected, in case that a designated period elapses after the representative path of the RU is set as the first path, or in case that phase alignment information is received.

According to various example embodiments, an electronic device of a digital unit (DU) is provided. The electronic device may comprise: a memory, at least one transceiver, and at least one processor coupled to the memory and the at least one transceiver. The at least one processor is configured to provide a radio unit (RU) with one or more reference signals for phase alignment. The one or more reference signals may be associated with one or more transmission paths of the RU. The at least one processor is configured to control the transceiver to transmit, to the RU, a response signal control message for a response message. The at least one processor is configured to control the transceiver to receive, from the RU, the response message. The response message may include, for each transmission path of the one or more transmission paths of the RU, a path identifier (ID) and a response signal for a reference signal corresponding to the path ID.

In an example, the at least one processor may be, to provide the RU with the one or more reference signals, configured to transmit, to the RU, a reference signal control message. The at least one processor may be, to provide the RU with the one or more reference signals, control the transceiver to transmit, to the RU, a data message including the one or more reference signals based on the reference signal control message. The reference signal control message may include an ID of the RU, an ID of each transmission path of the one or more transmission paths, and information for notifying that the one or more reference signals for the phase alignment are provided.

In an example, the at least one processor is, to provide the RU with the one or more reference signals, control the transceiver to transmit, to the RU, a reference signal control message. The reference signal control message may include an ID of the RU, a ID of each transmission path of the one or more transmission paths, and information for notifying that the one or more reference signals for the phase alignment are provided. The reference signal control message may include at least one of at least one parameter for generating the one or more reference signals or index information for indicating the one or more reference signals.

In an example, the at least one processor may be configured to generate phase alignment information for the RU based on the response message. The at least one processor may be configured to control the transceiver to transmit, to the RU, a message including the phase alignment information. The phase alignment information may include a phase compensation value determined based on a phase difference between the reference signal and the response signal. The RU may be one of a plurality of RUs configured for joint transmission.

In an example, the response signal may be associated with the reference signal and a signal outputted based on a transmission path corresponding to the path ID.

In an example, the at least one processor may be configured to change a representative path of the RU from a first path to a second path. The at least one processor may be configured to control the transceiver to transmit, to the RU, a control message including a path ID for indicating the second path.

In an example, the representative path of the RU may be changed based on a phase change of the first path being greater than a threshold being detected, based on a designated period elapsing after the representative path of the RU is set as the first path, or based on phase alignment information generated based on the response message being transmitted to the RU.

According to various example embodiments, an electronic device of a radio unit (RU) is provided. The electronic device may comprise: a memory, at least one transceiver, and at least one processor coupled to the memory and the at least one transceiver. The at least one processor may be configured to obtain one or more reference signals for phase alignment from a digital unit (DU). The one or more reference signals may be associated with one or more transmission paths of the RU. The at least one processor may be configured to receive, from the DU, a response signal control message for a response message. The at least one processor may be configured to transmit, to the DU, the response message. The response message may include, for each transmission path of the one or more transmission paths of the RU, a path identifier (ID) and a response signal for a reference signal corresponding to the path ID.

In an example, the at least one processor may be, to obtain the one or more reference signals for phase alignment, configured to receive, from the DU, a reference signal control message. The at least one processor may be, to obtain the one or more reference signals for phase alignment, receive, from the DU, a data message including the one or more reference signals based on the reference signal control message. The reference signal control message may include an ID of the RU, an ID of each transmission path of the one or more transmission paths, and information for notifying that the one or more reference signals for the phase alignment are provided.

In an example, the at least one processor may be, to obtain the one or more reference signals for phase alignment, configured to receive from the DU, a reference signal control message. The reference signal control message may include an ID of the RU, an ID of each transmission path of the one or more transmission paths, and information for notifying that the one or more reference signals for the phase alignment are provided. The reference signal control message may include at least one of at least one parameter for generating the one or more reference signals or index information for indicating the one or more reference signals.

In an example, the at least one processor may be configured to receive, from the DU, a message including phase alignment information. The phase alignment information may include a phase compensation value determined based on a phase difference between the reference signal and the response signal. The RU may be one of a plurality of RUs configured for joint transmission.

In an example, the response signal may be associated with the reference signal and a signal outputted based on a transmission path corresponding to the path ID.

In an example, the at least one processor may be configured to change a representative path of the RU from a first path to a second path. The at least one processor may be configured to allocate a path ID for indicating the first path within the RU to the second path.

In an example, the at least one processor may be configured to change a representative path of the RU from a first path to a second path. The at least one processor may be configured to control the transceiver to transmit, to the RU, an indication message including a path ID for indicating the second path. The representative path of the RU may be changed based on a phase change of the first path being greater than a threshold is detected, based on a designated period elapsing after the representative path of the RU is set as the first path, or based on phase alignment information being received.

According to embodiments, a non-transitory computer-readable storage medium is provided. The non-transitory computer-readable storage may comprise a memory storing instructions. The instructions, when executed by a processor, cause a digital unit (DU) to: provide a radio unit (RU) with one or more reference signals for phase alignment, transmit, to the RU, a response signal control message for a response message, and receive, from the RU, the response message. The one or more reference signals may be associated with one or more transmission paths of the RU. The response message may include, for each transmission path of the one or more transmission paths of the RU, a path identifier (ID) and a response signal for a reference signal corresponding to the path ID.

According to various example embodiments, a non-transitory computer-readable storage medium is provided. The non-transitory computer-readable storage may comprise a memory storing instructions. The instructions, when executed by a processor, cause a radio unit (RU) to: obtain one or more reference signals for phase alignment from a digital unit (DU), receive, from the DU, a response signal control message for a response message, and transmit, to the DU, the response message. The one or more reference signals may be associated with one or more transmission paths of the RU. The response message may include, for each transmission path of the one or more transmission paths of the RU, a path identifier (ID) and a response signal for a reference signal corresponding to the path ID.

According to various example embodiments, a method performed by a digital unit (DU) is provided. The method comprises transmitting, through a fronthaul interface, to a radio unit (RU), a reference signal control message for one or more reference signals. The reference signal control message includes an identifier (ID) of the RU and one or more path IDs of one or more transmission paths of the RU. The method comprises transmitting, through the fronthaul interface, to the RU, a data message including data of the one or more reference signals based on the reference signal control message, the data message causing the RU to transmit the one or more reference signals respectively through the one or more transmission paths of the RU. The method comprises transmitting, through the fronthaul interface, to the RU, a response signal control message for a response message. The method comprises receiving, through the fronthaul interface, from the RU, the response message. The response message includes data of one or more response signals for the one or more reference signals and the one or more path IDs of the one or more transmission paths of the RU. The one or more response signals are usable for phase alignment for joint transmission.

In an example, the reference signal control message includes a time interval for processing time of the RU to obtain the one or more response signals after obtaining the one or more reference signals. The reference signal control message includes at least one parameter for generating reference signals for the phase alignment in the RU. The reference signal control message includes the reference signal control message includes a total number of transmission paths for the joint transmission in the RU.

In an example, the method comprises generating phase alignment information for the RU by performing the phase alignment based on the one or more response signals of the RU and other response signals of another RU for the joint transmission, and transmitting, through the fronthaul interface, to the RU, the phase alignment information. The phase alignment information includes a phase compensation value for each of the one or more transmission paths of the RU.

In an example, the method comprises identifying a first path as a representative path for calculating phase difference between transmission paths in the RU, changing the representative path from the first path to a second path based on detecting that a phase change of the first path is greater than a threshold, transmitting, through the fronthaul interface, to the RU, a control message including a path ID indicating the second path. The one or more transmission paths of the RU includes the first path.

In an example, the reference signal control message includes section information for scheduling the data message and section extension information. The section extension information includes information of the one or more path IDs of one or more transmission paths of the RU, and information indicating that the one or more reference signals for phase alignment are provided.

In an example, the method comprises receiving, through the fronthaul interface, from the RU, a management-plane (M-plane) message including capability information of the RU. The capability information includes information for processing time of the RU to obtain the one or more response signals after obtaining the one or more reference signals.

In an example, the path ID includes an extended antenna-carrier (eAxC) ID using a band and sector ID, a component carrier ID, a spatial stream ID, and a DU port ID.

According to various example embodiments, a method performed by a radio unit (RU) is provided. The method comprises receiving, through a fronthaul interface, from a distribute unit (DU), a reference signal control message for one or more reference signals. The reference signal control message includes an identifier (ID) of the RU and one or more path IDs of one or more transmission paths of the RU. The method comprises receiving, through the fronthaul interface, from the DU, a data message including data of the one or more reference signals based on the reference signal control message. The method comprises obtaining one or more response signals by transmitting the one or more reference signals through the one or more transmission paths of the RU, respectively. The method comprises receiving, through the fronthaul interface, from the DU, a response signal control message for a response message. The method comprises transmitting, through the fronthaul interface, to the DU, the response message. The response message includes data of one or more response signals for the one or more reference signals and the one or more path IDs of the one or more transmission paths of the RU. The one or more response signals are usable for phase alignment for joint transmission.

In an example, the reference signal control message includes a time interval for processing time of the RU to obtain the one or more response signals after obtaining the one or more reference signals. The reference signal control message includes at least one parameter for generating reference signals for the phase alignment in the RU. The reference signal control message includes a total number of transmission paths for the joint transmission in the RU.

In an example, the method comprises receiving, through the fronthaul interface, from the DU, phase alignment information for the RU. The phase alignment information includes a phase compensation value for each of the one or more transmission paths of the RU.

In an example, the method comprises identifying a first path as a representative path for calculating phase difference between transmission paths in the RU, changing the representative path from the first path to a second path based on detecting that a phase change of the first path is greater than a threshold, and transmitting, through the fronthaul interface, to the DU, a control message including a path ID indicating the second path. The one or more transmission paths of the RU includes the first path.

In an example, the reference signal control message includes section information for scheduling the data message and section extension information. The section extension information includes information of the one or more path IDs of one or more transmission paths of the RU, and information indicating that the one or more reference signals for phase alignment are provided.

In an example, the method comprises transmitting, through the fronthaul interface, to the DU, a management-plane (M-plane) message including capability information of the RU. The capability information includes information for processing time of the RU to obtain the one or more response signals after obtaining the one or more reference signals.

In an example, the path ID includes an extended antenna-carrier (eAxC) ID using a band and sector ID, a component carrier ID, a spatial stream ID, and a DU port ID.

According to various example embodiments, a digital unit (DU) is provided. The DU comprises a transceiver, a processor, and memory storing instructions that, when executed by the at least one processor, cause the DU to control the transceiver to transmit, through a fronthaul interface, to a radio unit (RU), a reference signal control message for one or more reference signals. The reference signal control message includes an identifier (ID) of the RU and one or more path IDs of one or more transmission paths of the RU. The instructions, when executed by the at least one processor, cause the DU to control the transceiver to transmit, through the fronthaul interface, to the RU, a data message including data of the one or more reference signals based on the reference signal control message, the data message causing the RU to transmit the one or more reference signals respectively through the one or more transmission paths of the RU, control the transceiver to transmit, through the fronthaul interface, to the RU, a response signal control message for a response message, and control the transceiver to receive, through the fronthaul interface, from the RU, the response message. The response message includes data of one or more response signals for the one or more reference signals and the one or more path IDs of the one or more transmission paths of the RU. The one or more response signals are usable for phase alignment for joint transmission.

In ax example, the reference signal control message includes a time interval for processing time of the RU to obtain the one or more response signals after obtaining the one or more reference signals. The reference signal control message includes at least one parameter for generating reference signals for the phase alignment in the RU. The reference signal control message includes a total number of transmission paths for the joint transmission in the RU.

In ax example, the instructions, cause, when executed by the at least one processor, the DU to generate phase alignment information for the RU by performing the phase alignment based on the one or more response signals of the RU and other response signals of another RU for the joint transmission, and control the transceiver to transmit, through the fronthaul interface, to the RU, the phase alignment information. The phase alignment information includes a phase compensation value for each of the one or more transmission paths of the RU.

In ax example, the instructions, cause, when executed by the at least one processor, the DU to identify a first path as a representative path for calculating phase difference between transmission paths in the RU, change the representative path from the first path to a second path, and control the transceiver to transmit, to the RU, a control message including a path ID indicating the second path. The one or more transmission paths of the RU includes the first path.

In ax example, the reference signal control message includes section information for scheduling the data message and section extension information. The section extension information includes information of the one or more path IDs of one or more transmission paths of the RU, and information indicating that the one or more reference signals for phase alignment are provided.

According to various example embodiments, a radio unit (RU), comprises a transceiver, a processor, and memory storing instructions that, when executed by the processor, cause the RU to control the transceiver to receive, through a fronthaul interface, from a distribute unit (DU), a reference signal control message for one or more reference signals. The reference signal control message includes an identifier (ID) of the RU and one or more path IDs of one or more transmission paths of the RU. The instructions, when executed by the at least one processor, cause the DU to control the transceiver to receive, through the fronthaul interface, from the DU, a data message including the one or more reference signals based on the reference signal control message, obtain one or more response signals by transmitting the one or more reference signals through the one or more transmission paths of the RU, respectively, control the transceiver to receive, through the fronthaul interface, from the DU, a response signal control message for a response message, and control the transceiver to transmit, through the fronthaul interface, to the DU, the response message. The response message includes data of one or more response signals for the one or more reference signals and the one or more path IDs of the one or more transmission paths of the RU. The one or more response signals are usable for phase alignment for joint transmission.

According to various example embodiments, a non-transitory computer-readable storage medium is provided. The non-transitory computer-readable storage medium stores instructions, that, when executed by a processor of a digital unit (DU), cause the DU to perform operations comprising transmitting, through a fronthaul interface, to a radio unit (RU), a reference signal control message for one or more reference signals. The reference signal control message includes an identifier (ID) of the RU and one or more path IDs of one or more transmission paths of the RU. The operations comprise transmitting, through the fronthaul interface, to the RU, a data message including data of the one or more reference signals based on the reference signal control message, the data message causing the RU to transmit the one or more reference signals respectively through the one or more transmission paths of the RU, transmitting, through the fronthaul interface, to the RU, a response signal control message for a response message, and receiving, through the fronthaul interface, from the RU, the response message. The response message includes data of one or more response signals for the one or more reference signals and the one or more path IDs of the one or more transmission paths of the RU. The one or more response signals are usable for phase alignment for joint transmission.

According to various example embodiments, a non-transitory computer-readable storage medium is provided. The non-transitory computer-readable storage medium stores instructions, that, when executed by a processor of a digital unit (DU), cause the DU to perform operations comprising receiving, through a fronthaul interface, from a distribute unit (DU), a reference signal control message for one or more reference signals. The reference signal control message includes an identifier (ID) of the RU and one or more path IDs of one or more transmission paths of the RU. The operations comprise receiving, through the fronthaul interface, from the DU, a data message including data of the one or more reference signals based on the reference signal control message, obtaining one or more response signals by transmitting the one or more reference signals through the one or more transmission paths of the RU, respectively, receiving, through the fronthaul interface, from the DU, a response signal control message for a response message, and transmitting, through the fronthaul interface, to the DU, the response message. The response message includes data of one or more response signals for the one or more reference signals and the one or more path IDs of the one or more transmission paths of the RU. The one or more response signals are usable for phase alignment for joint transmission.

The methods according to various embodiments described in the claims and/or the disclosure may be implemented in hardware, software, or a combination of hardware and software.

When implemented by software, a computer-readable storage medium storing one or more programs (software modules) may be provided. One or more programs stored in such a computer-readable storage medium are configured for execution by one or more processors in an electronic device. The one or more programs include instructions that cause the electronic device to execute the methods according to embodiments described in the claims or the disclosure. The one or more programs may be included in a computer program product and provided. The computer program product may be traded between sellers and buyers as commodities. The computer program product is distributed in the form of a device-readable storage medium (e.g. compact disc read only memory (CD-ROM)), or through an application store (e.g. Play Store™), or between two user devices directly (e.g. between smart phones, or distributed by online (e.g., downloaded or uploaded). In the case of online distribution, at least part of the computer program product may be temporarily stored or temporarily created in a device-readable storage medium such as a manufacturer's server, an application store server, or a relay server's memory.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of these components. Further, respective memories may be provided in a multiple number.

Further, the program may be stored in an attachable storage device that can be accessed via a communication network such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described example embodiments of the disclosure, a component included therein may be expressed in a singular or plural form according to a specific embodiment presented. However, such a singular or plural expression may be selected to better suit the situation presented, for the convenience of description, and the disclosure is not limited to the singular or plural component(s). Therefore, even any component expressed in the plural form may be configured of a singular component, or even any component expressed in the singular form may be configured of plural components.

According to various example embodiments, one or more components or operations among the corresponding components described above may be omitted, or one or more other components or operations may be added. Alternatively or additionally, a plurality of components (e.g., modules or programs) may be integrated into a single component. In this case, the integrated component may perform one or more functions of each of the plurality of components identically or similarly to those performed by a corresponding component of the plurality of components prior to the integration. According to embodiments, the operations performed by a module, program, or other component are executed sequentially, in parallel, iteratively, or heuristically, or one or more of the operations are executed in a different order, omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from full scope of the disclosure, including the appended claims and their equivalents. It will also be understood that any of the embodiment(s) described herein may be used in conjunction with any other embodiment(s) described herein.

What is claimed is:

1. A method performed by a digital unit (DU), the method comprising:

transmitting, through a fronthaul interface, to a radio unit (RU), a reference signal control message for one or more reference signals, wherein the reference signal control message includes an identifier (ID) of the RU and one or more path IDs of one or more transmission paths of the RU;

transmitting, through the fronthaul interface, to the RU, a data message including data of the one or more reference signals based on the reference signal control message, the data message causing the RU to transmit the one or more reference signals respectively through the one or more transmission paths of the RU;

transmitting, through the fronthaul interface, to the RU, a response signal control message for a response message; and receiving, through the fronthaul interface, from the RU, the response message, wherein the response message includes data of one or more response signals for the one or more reference signals and the one or more path IDs of the one or more transmission paths of the RU, and wherein the one or more response signals are usable for phase alignment for joint transmission.

2. The method of claim 1, wherein the reference signal control message further includes:

a time interval for processing time of the RU to obtain the one or more response signals after obtaining the one or more reference signals, at least one parameter for generating reference signals for the phase alignment in the RU, and a total number of transmission paths for the joint transmission in the RU.

3. The method of claim 1, further comprising:

generating phase alignment information for the RU by performing the phase alignment based on the one or more response signals of the RU and other response signals of another RU for the joint transmission, and transmitting, through the fronthaul interface, to the RU, the phase alignment information, wherein the phase alignment information includes a phase compensation value for each of the one or more transmission paths of the RU.

4. The method of claim 1, further comprising:

identifying a first path as a representative path for calculating phase difference between transmission paths of the RU;

changing the representative path from the first path to a second path based on detecting that a phase change of the first path is greater than a threshold; and transmitting, through the fronthaul interface, to the RU, a control message including a path ID indicating the second path, wherein the one or more transmission paths of the RU includes the first path.

5. The method of claim 1, wherein the reference signal control message includes section information for scheduling the data message and section extension information, and wherein the section extension information includes:

information of the one or more path IDs of one or more transmission paths of the RU, and information indicating that the one or more reference signals for phase alignment are provided.

6. The method of claim 1, further comprising:

receiving, through the fronthaul interface, from the RU, a management-plane (M-plane) message including capability information of the RU, wherein the capability information includes information for processing time of the RU to obtain the one or more response signals after obtaining the one or more reference signals.

7. The method of claim 1, wherein one or more the path IDs includes an extended antenna-carrier (eAxC) ID using a band and sector ID, a component carrier ID, a spatial stream ID, and a DU port ID.

8. A method performed by a radio unit (RU), the method comprising:

receiving, through a fronthaul interface, from a digital unit (DU), a reference signal control message for one or more reference signals, wherein the reference signal control message includes an identifier (ID) of the RU and one or more path IDs of one or more transmission paths of the RU;

receiving, through the fronthaul interface, from the DU, a data message including data of the one or more reference signals based on the reference signal control message;

obtaining one or more response signals by transmitting the one or more reference signals through the one or more transmission paths of the RU, respectively;

receiving, through the fronthaul interface, from the DU, a response signal control message for a response message; and transmitting, through the fronthaul interface, to the DU, the response message, wherein the response message includes data of one or more response signals for the one or more reference signals and the one or more path IDs of the one or more transmission paths of the RU, and wherein the one or more response signals are usable for phase alignment for joint transmission.

9. The method of claim 8, wherein the reference signal control message further includes:

a time interval for processing time of the RU to obtain the one or more response signals after obtaining the one or more reference signals, at least one parameter for generating reference signals for the phase alignment in the RU, and a total number of transmission paths for the joint transmission in the RU.

10. The method of claim 8, further comprising:

receiving, through the fronthaul interface, from the DU, phase alignment information for the RU, wherein the phase alignment information includes a phase compensation value for each of the one or more transmission paths of the RU.

11. The method of claim 8, further comprising:

identifying a first path as a representative path for calculating phase difference between transmission paths of the RU;

changing the representative path from the first path to a second path based on detecting that a phase change of the first path is greater than a threshold; and transmitting, through the fronthaul interface, to the DU, a control message including a path ID indicating the second path, wherein the one or more transmission paths of the RU includes the first path.

12. The method of claim 8, wherein the reference signal control message includes section information for scheduling the data message and section extension information, and wherein the section extension information includes:

information of the one or more path IDs of one or more transmission paths of the RU, and information indicating that the one or more reference signals for phase alignment are provided.

13. The method of claim 8, further comprising:

transmitting, through the fronthaul interface, to the DU, a management-plane (M-plane) message including capability information of the RU, wherein the capability information includes information for processing time of the RU to obtain the one or more response signals after obtaining the one or more reference signals.

14. The method of claim 8, wherein the one or more path IDs includes an extended antenna-carrier (eAxC) ID using a band and sector ID, a component carrier ID, a spatial stream ID, and a DU port ID.

15. A digital unit (DU), comprising:

a transceiver;

at least one processor; and memory storing instructions that, when executed by the at least one processor, cause the DU to:

control the transceiver to transmit, through a fronthaul interface, to a radio unit (RU), a reference signal control message for one or more reference signals, wherein the reference signal control message includes an identifier (ID) of the RU and one or more path IDs of one or more transmission paths of the RU;

control the transceiver to transmit, through the fronthaul interface, to the RU, a data message including data of the one or more reference signals based on the reference signal control message, the data message causing the RU to transmit the one or more reference signals respectively through the one or more transmission paths of the RU;

control the transceiver to transmit, through the fronthaul interface, to the RU, a response signal control message for a response message; and control the transceiver to receive, through the fronthaul interface, from the RU, the response message, wherein the response message includes data of one or more response signals for the one or more reference signals and the one or more path IDs of the one or more transmission paths of the RU, and wherein the one or more response signals are usable for phase alignment for joint transmission.

16. The DU of claim 15, wherein the reference signal control message further includes:

a time interval for processing time of the RU to obtain the one or more response signals after obtaining the one or more reference signals, at least one parameter for generating reference signals for the phase alignment in the RU, and a total number of transmission paths for the joint transmission in the RU.

17. The DU of claim 15, wherein the instructions, when executed by the at least one processor, cause the DU to:

generate phase alignment information for the RU by performing the phase alignment based on the one or more response signals of the RU and other response signals of another RU for the joint transmission, and control the transceiver to transmit, through the fronthaul interface, to the RU, the phase alignment information, and wherein the phase alignment information includes a phase compensation value for each of the one or more transmission paths of the RU.

18. The DU of claim 15, wherein the instructions, cause, when executed by the at least one processor, cause the DU to:

identify a first path as a representative path for calculating phase difference between transmission paths of the RU;

change the representative path from the first path to a second path based on detecting that a phase change of the first path is greater than a threshold; and control the transceiver to transmit, to the RU, a control message including a path ID indicating the second path, and wherein the one or more transmission paths of the RU includes the first path.

19. The DU of claim 15, wherein the reference signal control message includes section information for scheduling the data message and section extension information, and wherein the section extension information includes:

information of the one or more path IDs of one or more transmission paths of the RU, and information indicating that the one or more reference signals for phase alignment are provided.

20. A radio unit (RU), comprising:

a transceiver;

a processor; and memory storing instructions that, when executed by the processor, cause the RU to:

control the transceiver to receive, through a fronthaul interface, from a digital unit (DU), a reference signal control message for one or more reference signals, wherein the reference signal control message includes an identifier (ID) of the RU and one or more path IDs of one or more transmission paths of the RU;

control the transceiver to receive, through the fronthaul interface, from the DU, a data message including the one or more reference signals based on the reference signal control message;

obtain one or more response signals by transmitting the one or more reference signals through the one or more transmission paths of the RU, respectively;

control the transceiver to receive, through the fronthaul interface, from the DU, a response signal control message for a response message; and control the transceiver to transmit, through the fronthaul interface, to the DU, the response message, wherein the response message includes data of one or more response signals for the one or more reference signals and the one or more path IDs of the one or more transmission paths of the RU, and wherein the one or more response signals are usable for phase alignment for joint transmission.

21. A non-transitory computer-readable storage medium storing instructions, that, when executed by a processor of a digital unit (DU), cause the DU to perform operations comprising:

transmitting, through a fronthaul interface, to a radio unit (RU), a reference signal control message for one or more reference signals, wherein the reference signal control message includes an identifier (ID) of the RU and one or more path IDs of one or more transmission paths of the RU;

transmitting, through the fronthaul interface, to the RU, a data message including data of the one or more reference signals based on the reference signal control message, the data message causing the RU to transmit the one or more reference signals respectively through the one or more transmission paths of the RU;

transmitting, through the fronthaul interface, to the RU, a response signal control message for a response message; and receiving, through the fronthaul interface, from the RU, the response message, wherein the response message includes data of one or more response signals for the one or more reference signals and the one or more path IDs of the one or more transmission paths of the RU, and wherein the one or more response signals are usable for phase alignment for joint transmission.

22. A non-transitory computer-readable storage medium storing instructions, that, when executed by a processor of a radio unit (RU), cause the RU to perform operations comprising:

receiving, through a fronthaul interface, from a digital unit (DU), a reference signal control message for one or more reference signals, wherein the reference signal control message includes an identifier (ID) of the RU and one or more path IDs of one or more transmission paths of the RU;

receiving, through the fronthaul interface, from the DU, a data message including data of the one or more reference signals based on the reference signal control message;

obtaining one or more response signals by transmitting the one or more reference signals through the one or more transmission paths of the RU, respectively;

receiving, through the fronthaul interface, from the DU, a response signal control message for a response message; and transmitting, through the fronthaul interface, to the DU, the response message, wherein the response message includes data of one or more response signals for the one or more reference signals and the one or more path IDs of the one or more transmission paths of the RU, and wherein the one or more response signals are usable for phase alignment for joint transmission.

* * * * *